US012651833B2

(12) United States Patent
Horn et al.

(10) Patent No.: US 12,651,833 B2
(45) Date of Patent: Jun. 9, 2026

(54) MISALIGNMENT CORRECTION OF ORBITAL ANGULAR MOMENTUM (OAM) BEAMS

(71) Applicant: QUALCOMM Incorporated, San Diego, CA (US)

(72) Inventors: Idan Michael Horn, Hod Hasharon (IL); Shay Landis, Hod Hasharon (IL); Assaf Touboul, Netanya (IL); Yehonatan Dallal, Kfar Saba (IL); Ran Berliner, Kfar Aviv (IL); Amit Bar-Or Tillinger, Tel-Aviv (IL)

(73) Assignee: QUALCOMM Incorporated, San Diego, CA (US)

( * ) Notice: Subject to any disclaimer, the term of this patent is extended or adjusted under 35 U.S.C. 154(b) by 494 days.

(21) Appl. No.: 17/935,061

(22) Filed: Sep. 23, 2022

(65) Prior Publication Data

US 2024/0113428 A1 Apr. 4, 2024

(51) Int. Cl.
*H01Q 3/36* (2006.01)
*H01Q 3/26* (2006.01)
(Continued)

(52) U.S. Cl.
CPC .............. *H01Q 3/36* (2013.01); *H01Q 3/267* (2013.01); *H01Q 3/40* (2013.01); *H04B 7/0617* (2013.01); *H04B 7/0619* (2013.01)

(58) Field of Classification Search
CPC . H01Q 3/267; H01Q 3/36; H01Q 3/40; H04B 7/0617; H04B 7/0619; H04B 7/063; H04B 7/0634
See application file for complete search history.

(56) References Cited

U.S. PATENT DOCUMENTS

2023/0268976 A1 * 8/2023 Neshaastegaran ....... H04B 7/01
375/267

FOREIGN PATENT DOCUMENTS

CN        108282208 A  *  7/2018  ............. H04B 17/12
EP        4087061 A1 * 11/2022  ............. H01Q 21/20
(Continued)

OTHER PUBLICATIONS

D. Shin et al., Identification of Non-ideal Receiver Condition for Orbital Angular Momentum Transmission, IEEE 79th Vehicular Technology Conference, 5 pages (Year: 2014).*
(Continued)

*Primary Examiner* — Robert W Hodge
*Assistant Examiner* — Fred H Mull
(74) *Attorney, Agent, or Firm* — Polsinelli//Qualcomm Incorporated

(57) ABSTRACT

Aspects of the disclosure relate to devices, wireless communication apparatuses, methods, and other aspects of correcting misalignment for orbital angular momentum beams. In one aspect, a wireless communication apparatus comprises a beamforming network comprising a plurality of antenna ports and a plurality of beam ports, wherein the plurality of antenna ports are positioned for communicating orbital angular momentum (OAM) beams, a plurality of output phase shifters, wherein each output phase shifter is coupled to a corresponding antenna port of the plurality of antenna ports, and control circuitry coupled to the plurality of output phase shifters and configured to select phase shift values for the plurality of output phase shifters to correct a misalignment of the OAM beams.

28 Claims, 12 Drawing Sheets

(51) Int. Cl.
    *H01Q 3/40*         (2006.01)
    *H04B 7/06*         (2006.01)

(56)           References Cited

FOREIGN PATENT DOCUMENTS

WO     WO-2021077921 A1 *   4/2021   .............. G01S 3/46
WO        2021147613 A1     7/2021

OTHER PUBLICATIONS

E. Aydin et al., Polarization Reconfigurable Antennas for HF MIMO Communications, 24th Signal Processing and Communication Application Conference (SIU), p. 1497-1500 (Year: 2016).*

Microwaves101.com (Phase Shifters), https://www.microwaves101.com/encyclopedias/phase-shifters, 5 pages, Jul. 2022 (Year: 2022).*

Nyquist sampling rate. (1999). Focal Dictionary of Telecommunications, Focal Press (1st ed.). Routledge. https://search.credoreference.com/articles/Qm9va0FydGljbGU6MTQzNTEyNQ== (Year: 1999).*

Chen R., et al., "Beam Steering for the Misalignment in UCA-Based OAM Communication Systems", IEEE Wireless Communications Letters, Piscataway, NJ, USA, vol. 7, No. 4, Aug. 1, 2018, pp. 582-585, XP011691622, ISSN: 2162-2337, DOI: 10.1109/LWC.2018.2797931 [retrieved on Aug. 16, 2018] Sections II and IV, p. 2-p. 4, figure 3.

International Search Report and Written Opinion—PCT/US2023/074194—ISA/EPO—Jan. 5, 2024.

Wu X., et al: "Inter-Mode Crosstalk Compensation for Radio Orbital Angular Momentum Multiplexing Systems Under Misaligned Condition Using Multiple-Input Multiple-Output Techniques", 2016 15th International Conference on Optical communications and Networks (ICOCN), IEEE, Sep. 24, 2016, 3 Pages, XP033075089, DOI: 10.1109/ICOCN.2016.7875646 [retrieved on Mar. 10, 2017] Section 2.3, Section 3, p. 2-p. 3, figure 3.

* cited by examiner

Orthogonal
Beams
400

Helical
Structures
421

Phase
Fronts
422

Intensity
Distributions
423

Beam 410 ⟶

$m = +2$

Beam 411 ⟶

$m = +1$

Beam 412 ⟶

$m = 0$

Beam 413 ⟶

$m = -1$

Beam 414 ⟶

$m = -2$

500

Directional
Beams
550-1
through
550-8

Antenna
Elements
542-1
through
542-8

Antenna
Ports
540-1
through
540-8

Butler
Matrix
Phase
Shifters
530

Butler Matrix
Couplers
520

Beam Ports
510-1
through
510-8

Antenna
Elements
650-1
through
650-8

Butler
Matrix
Phase
Shifters
630

Butler Matrix
Couplers
620

Beam Ports
610-1
through
610-8

800

Antenna
Elements
850-1
through
850-8

Phase
Shifters
840-1
through
840-8

Butler
Matrix
Phase
Shifters
830

Butler Matrix
Couplers
820

Beam Ports
810-1
through
810-8

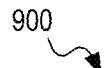

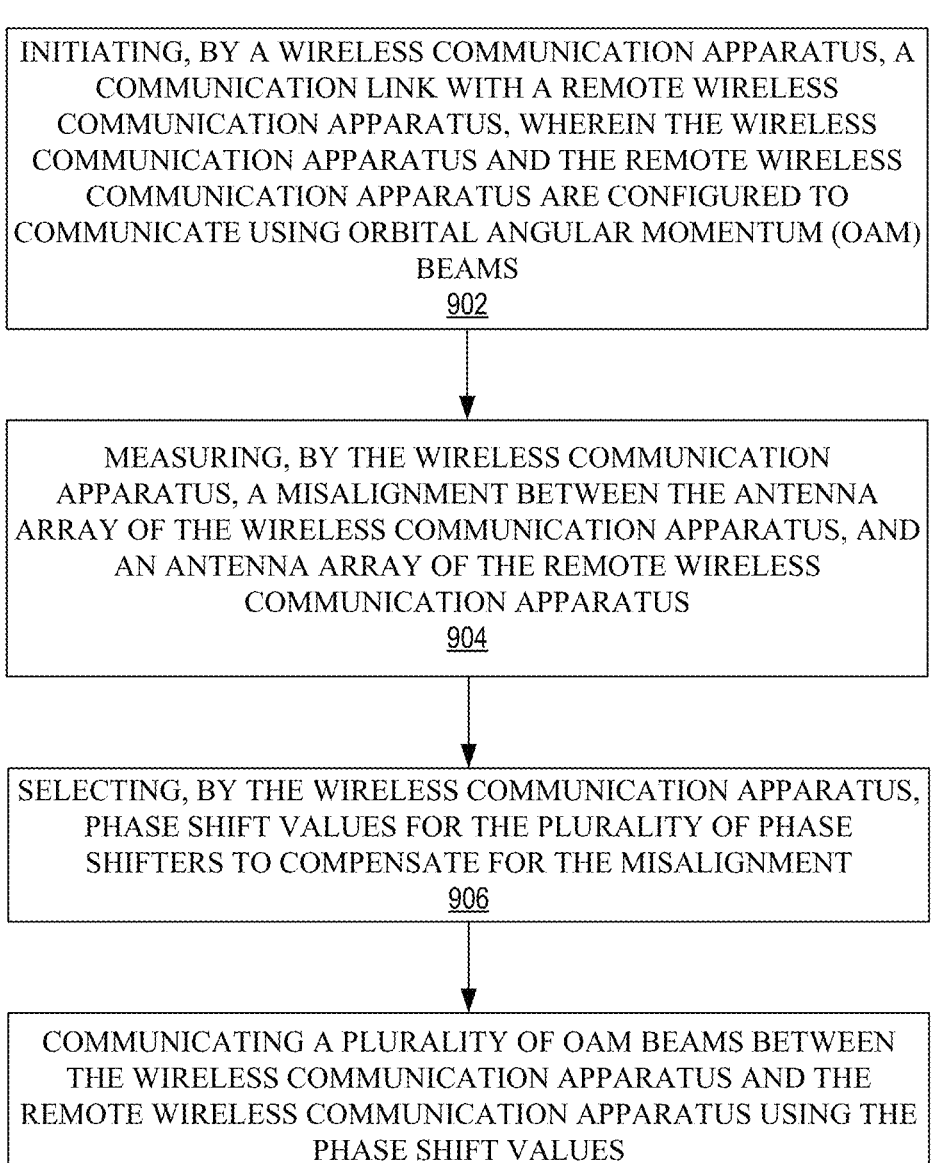

INITIATING, BY A WIRELESS COMMUNICATION APPARATUS, A COMMUNICATION LINK WITH A REMOTE WIRELESS COMMUNICATION APPARATUS, WHEREIN THE WIRELESS COMMUNICATION APPARATUS AND THE REMOTE WIRELESS COMMUNICATION APPARATUS ARE CONFIGURED TO COMMUNICATE USING ORBITAL ANGULAR MOMENTUM (OAM) BEAMS
902

MEASURING, BY THE WIRELESS COMMUNICATION APPARATUS, A MISALIGNMENT BETWEEN THE ANTENNA ARRAY OF THE WIRELESS COMMUNICATION APPARATUS, AND AN ANTENNA ARRAY OF THE REMOTE WIRELESS COMMUNICATION APPARATUS
904

SELECTING, BY THE WIRELESS COMMUNICATION APPARATUS, PHASE SHIFT VALUES FOR THE PLURALITY OF PHASE SHIFTERS TO COMPENSATE FOR THE MISALIGNMENT
906

COMMUNICATING A PLURALITY OF OAM BEAMS BETWEEN THE WIRELESS COMMUNICATION APPARATUS AND THE REMOTE WIRELESS COMMUNICATION APPARATUS USING THE PHASE SHIFT VALUES
908

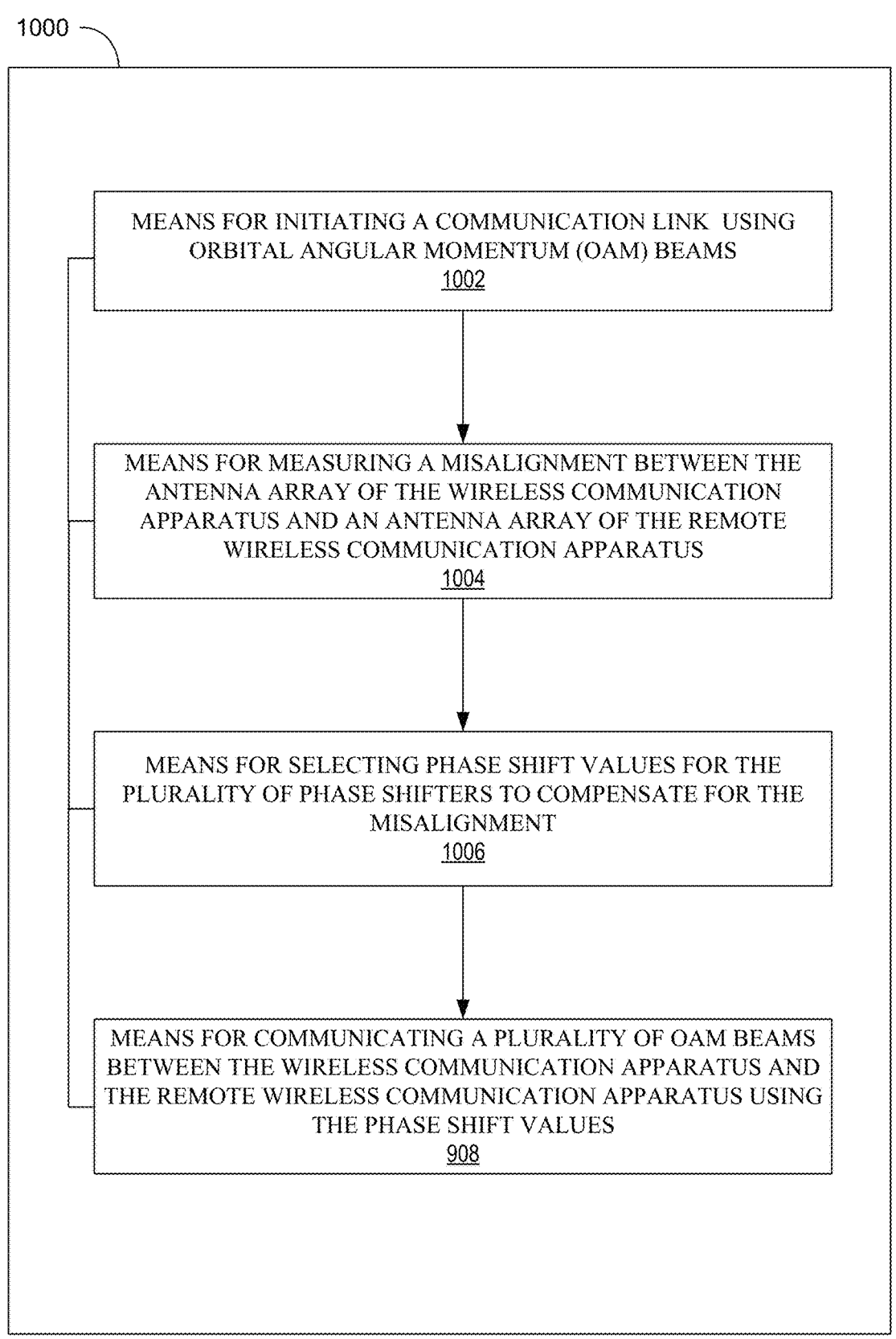

MEANS FOR INITIATING A COMMUNICATION LINK  USING ORBITAL ANGULAR MOMENTUM (OAM) BEAMS
1002

MEANS FOR MEASURING A MISALIGNMENT BETWEEN THE ANTENNA ARRAY OF THE WIRELESS COMMUNICATION APPARATUS AND AN ANTENNA ARRAY OF THE REMOTE WIRELESS COMMUNICATION APPARATUS
1004

MEANS FOR SELECTING PHASE SHIFT VALUES FOR THE PLURALITY OF PHASE SHIFTERS TO COMPENSATE FOR THE MISALIGNMENT
1006

MEANS FOR COMMUNICATING A PLURALITY OF OAM BEAMS BETWEEN THE WIRELESS COMMUNICATION APPARATUS AND THE REMOTE WIRELESS COMMUNICATION APPARATUS USING THE PHASE SHIFT VALUES
908

FIG. 10

MISALIGNMENT CORRECTION OF ORBITAL ANGULAR MOMENTUM (OAM) BEAMS

FIELD

The present disclosure relates generally to electronics and wireless communications. For example, aspects of the present disclosure relate to orthogonal orbital angular momentum (OAM) beams used for wireless communications.

BACKGROUND

Wireless communication devices and technologies are becoming ever more prevalent. Wireless communication devices generally transmit and receive communication signals. A communication signal is typically processed by a variety of different components and circuits. In some modern communication systems, many different wavelengths of electromagnetic waves can be used in a single device, and specialized transmit and receive configurations can be used to generate and received orthogonal signals in the same wireless paths. Providing consistent signals in such environments can involve additional complexity in a wireless communication system.

SUMMARY

Various implementations of systems, methods and devices within the scope of the appended claims each have several aspects, no single one of which is solely responsible for the desirable attributes described herein. Without limiting the scope of the appended claims, some prominent features are described herein.

In some aspects, systems and techniques are described for misalignment correction of orthogonal orbital angular momentum (OAM) beams. Disclosed are systems, apparatuses, methods, and computer-readable media for misalignment correction as described herein. According to at least one example, an apparatus is provided for misalignment correction as described herein. The apparatus includes: a beamforming network comprising a plurality of antenna ports and a plurality of beam ports, wherein the plurality of antenna ports are positioned for communicating orbital angular momentum (OAM) beams; a plurality of output phase shifters, wherein each output phase shifter is coupled to a corresponding antenna port of the plurality of antenna ports; and control circuitry coupled to the plurality of output phase shifters and configured to select phase shift values for the plurality of output phase shifters to correct a misalignment of the OAM beams.

In some aspects, the beamforming network is a Butler Matrix. In some aspects, a plurality of antenna elements, wherein the Butler matrix comprises an output electrically coupled to the plurality of antenna elements. In some aspects, the beamforming network is a Rotman lens. In some aspects, an antenna array comprising a plurality of antenna elements, wherein each antenna element of the plurality of antenna elements is coupled to the corresponding antenna port of the plurality of antenna ports.

In some aspects, the plurality of antenna elements are positioned in a circular formation having a predefined radius, with a corresponding position for each antenna element associated with an orbital phase of the OAM beams. In some aspects, the control circuitry is configured to measure the misalignment of the OAM beams in communication with a remote wireless communication apparatus.

In some aspects, the misalignment comprises one or more of an off-axis misalignment, a nonparallel misalignment, and a rotation mismatch alignment.

In some aspects, the plurality of output phase shifters comprise varactor phase shifters tunable with the phase shift values determined by a projection of each antenna elements on a transmission-reception line to a corresponding antenna element of a remote wireless communication apparatus.

In some aspects, the control circuitry is configured to measure the misalignment by calculating an alignment for each pair of antenna elements to determine the phase shift values for each phase shifter associated with the corresponding antenna element and antenna port. In some aspects, the plurality of output phase shifters comprise passive phase shifters. In some aspects, the plurality of output phase shifters comprise bidirectional phase shifters for providing reciprocal phase adjustments to transmission OAM beams and received OAM beams of the OAM beams.

In some aspects, transceiver circuitry coupled to the plurality of beam ports, and provide a plurality of OAM beams to the plurality of beam ports, wherein each beam port of the plurality of beam ports receives a signal associated with samples of the plurality of OAM beams at a set orbital phase corresponding to each beam port.

In some aspects, the samples of the plurality of OAM beams are sampled at a rate sufficient to avoid phase aliasing between the OAM beams. In some aspects, the misalignment comprises a rotation mismatch, and wherein the control circuitry is configured to adjust a differential phase of a signal for each beam port based on the rotation mismatch.

In another aspect a method for misalignment is provided. The method comprises initiating, by a wireless communication apparatus, a communication link with a remote wireless communication apparatus, wherein the wireless communication apparatus and the remote wireless communication apparatus are configured to communicate using orbital angular momentum (OAM) beams, and wherein the wireless communication apparatus comprises a Butler Matrix, an antenna array, and a plurality of phase shifters coupling antenna ports of the Butler Matrix to corresponding elements of the antenna array; measuring, by the wireless communication apparatus, a misalignment between the antenna array of the wireless communication apparatus, and an antenna array of the remote wireless communication apparatus; selecting, by the wireless communication apparatus, phase shift values for the plurality of phase shifters to compensate for the misalignment; and communicating a plurality of OAM beams between the wireless communication apparatus and the remote wireless communication apparatus using the phase shift values.

In another aspect, a wireless communication apparatus is provided for misalignment correction. The apparatus comprises means for initiating a communication link with a remote wireless communication apparatus using orbital angular momentum (OAM) beams, means for measuring, by the wireless communication apparatus, a misalignment between the antenna array of the wireless communication apparatus, and an antenna array of the remote wireless communication apparatus; means for selecting, by the wireless communication apparatus, phase shift values for the plurality of phase shifters to compensate for the misalignment; and means for communicating a plurality of OAM beams between the wireless communication apparatus and the remote wireless communication apparatus using the phase shift values.

In another aspect, a wireless communication apparatus is provided. The wireless communication apparatus comprises transceiver circuitry configured to generate signals for a plurality of orbital angular momentum (OAM) beams; a plurality of beam ports coupled to the transceiver circuitry to communicate the plurality of OAM beams; a plurality of antenna ports, wherein each antenna port is associated with a corresponding orbital phase of the plurality of OAM beams; a plurality of three decibel 90-degree couplers and internal phase shifters configured to couple the plurality of beam ports to the plurality of antenna ports; and a plurality of antenna elements positioned in a circular array, with each element coupled to a corresponding antenna port of the plurality of antenna ports.

The foregoing, together with other features and embodiments, will become more apparent upon referring to the following specification, claims, and accompanying drawings.

BRIEF DESCRIPTION OF THE DRAWINGS

In the figures, like reference numerals refer to like parts throughout the various views unless otherwise indicated. For reference numerals with letter character designations such as "102a" or "102b", the letter character designations may differentiate two like parts or elements present in the same figure. Letter character designations for reference numerals may be omitted when it is intended that a reference numeral encompass all parts having the same reference numeral in all figures.

FIG. 9 illustrates aspects of a method for correcting OAM beam misalignment in accordance with aspects described herein.

FIG. 10 illustrates aspects of a device for correcting OAM beam misalignment in accordance with aspects described herein.

DETAILED DESCRIPTION

Figure 1:
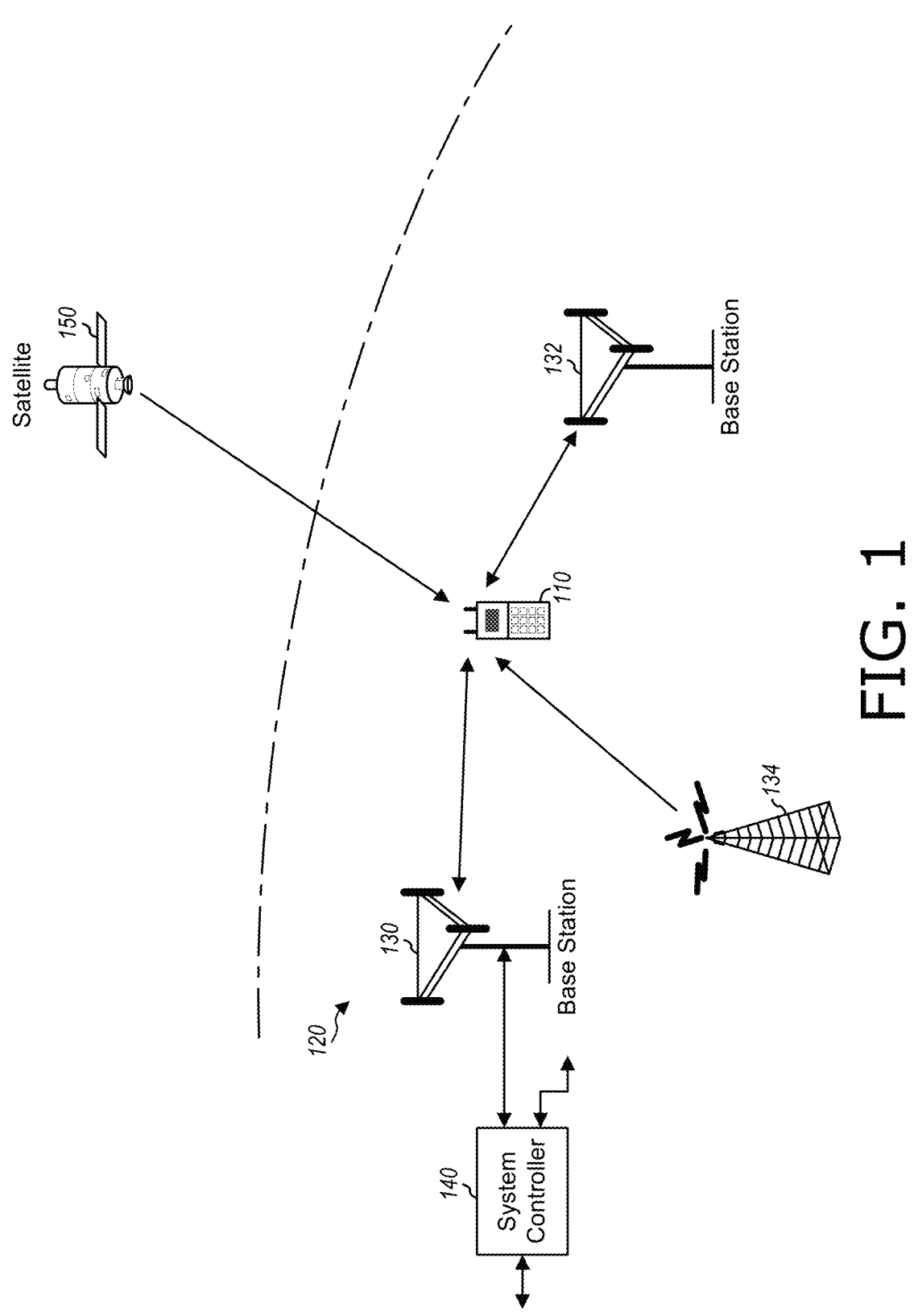
FIG. 1 is a diagram showing a wireless communication system communicating with a wireless device that can be implemented according to aspects described herein.

The detailed description set forth below in connection with the appended drawings is intended as a description of exemplary implementations and is not intended to represent the only implementations in which the invention may be practiced. The term "exemplary" used throughout the description means "serving as an example, instance, or illustration," and should not necessarily be construed as preferred or advantageous over other exemplary implementations. The detailed description includes specific details for the purpose of providing a thorough understanding of the exemplary implementations. In some instances, some devices are shown in block diagram form. Drawing elements that are common among the following figures may be identified using the same reference numerals.

Cellular communication systems use centralized base stations and system controllers to allow mobile devices to send and receive wireless data from a wide variety of locations. Such base stations require significant resources, and certain environments, particularly at higher frequencies, are difficult to cover without blind spots in the communication system due to signal absorption or signal reflections. Communication coverage in some environments can involve multiple fixed base stations which may communicate with each other wirelessly in order to manage system performance and to distribute communication loads. Orbital angular momentum (OAM) multiplexing is one possible technology that can be used to increase system throughput for a given communication band, particularly at millimeter wave (mmW) frequencies and other higher bands. One difficulty with OAM multiplexing is that signal beam misalignments can degrade performance. Such misalignments can degrade performance even when both endpoints are fixed in a relatively stable fashion. Temperature variations, weather variations and atmospheric changes, wind generating movement of a pole that a communication device is mounted on, and other such small variations in fixed position devices can result in degraded performance due to misalignments caused by such variations.

Aspects described herein include beamforming-network based OAM multiplexing systems for mmW and higher band communications, with phase shifters positioned between a beamforming network outputs and antenna array elements. Such controllable phase shifters can be used to dynamically compensate for misalignments described above in the described beamforming-network based OAM multiplexing systems. Depending on the particular components and phase shifters used, aspects can improve the operation of an OAM multiplexing system by allowing misalignment tracking and correction with a low complexity and low power phase shifter solution.

FIG. 1 is a diagram showing a communication system 120 that can includes devices that can use OAM multiplexing communications with misalignment tracking and correction in accordance with aspects described herein. The wireless communication system 120 may be a Long Term Evolution (LTE) system, a Code Division Multiple Access (CDMA) system, a Global System for Mobile Communications (GSM) system, a wireless local area network (WLAN) system, a 5G NR (new radio) system, or some other wireless system. A CDMA system may implement Wideband CDMA (WCDMA), CDMA 1x, Evolution-Data Optimized (EVDO), Time Division Synchronous CDMA (TD-SCDMA), or some other version of CDMA. For simplicity, FIG. 1 shows wireless communication system 120 including base stations 130 and 132, and one system controller 140. In general, a wireless communication system may include any number of base stations, and any set of other network entities, which may use OAM multiplexing communications in accordance with aspects described herein.

The wireless device 110 may also be referred to as a user equipment (UE), a mobile station, a terminal, an access terminal, a subscriber unit, a station, etc. Wireless device 110 may be a cellular phone, a smartphone, a tablet, or other such mobile device (e.g., a device integrated with a display screen). Other examples of the wireless device 110 include a wireless modem, a personal digital assistant (PDA), a handheld device, a laptop computer, a smartbook, a netbook, a tablet, a cordless phone, a medical device, a device configured to connect to one or more other devices (for example through the internet of things), a wireless local loop (WLL) station, a Bluetooth device, etc. Wireless device 110 may communicate with wireless communication system 120. Wireless device 110 may also receive signals from broadcast stations (e.g., a broadcast station 134) and/or signals from satellites (e.g., a satellite 150 in one or more global navigation satellite systems (GNSS), etc.). Wireless device 110 may support one or more radio technologies for wireless communication such as LTE, WCDMA, CDMA 1×, EVDO, TD-SCDMA, GSM, 802.11, 5G, etc. In some examples, UE 110 may use OAM multiplexing communications in accordance with aspects described herein. Some such examples may operate at relatively high frequencies, for example in the sub-THz range, where a plurality of antennas and/or beam-forming devices may have a small form factor.

Figure 2:
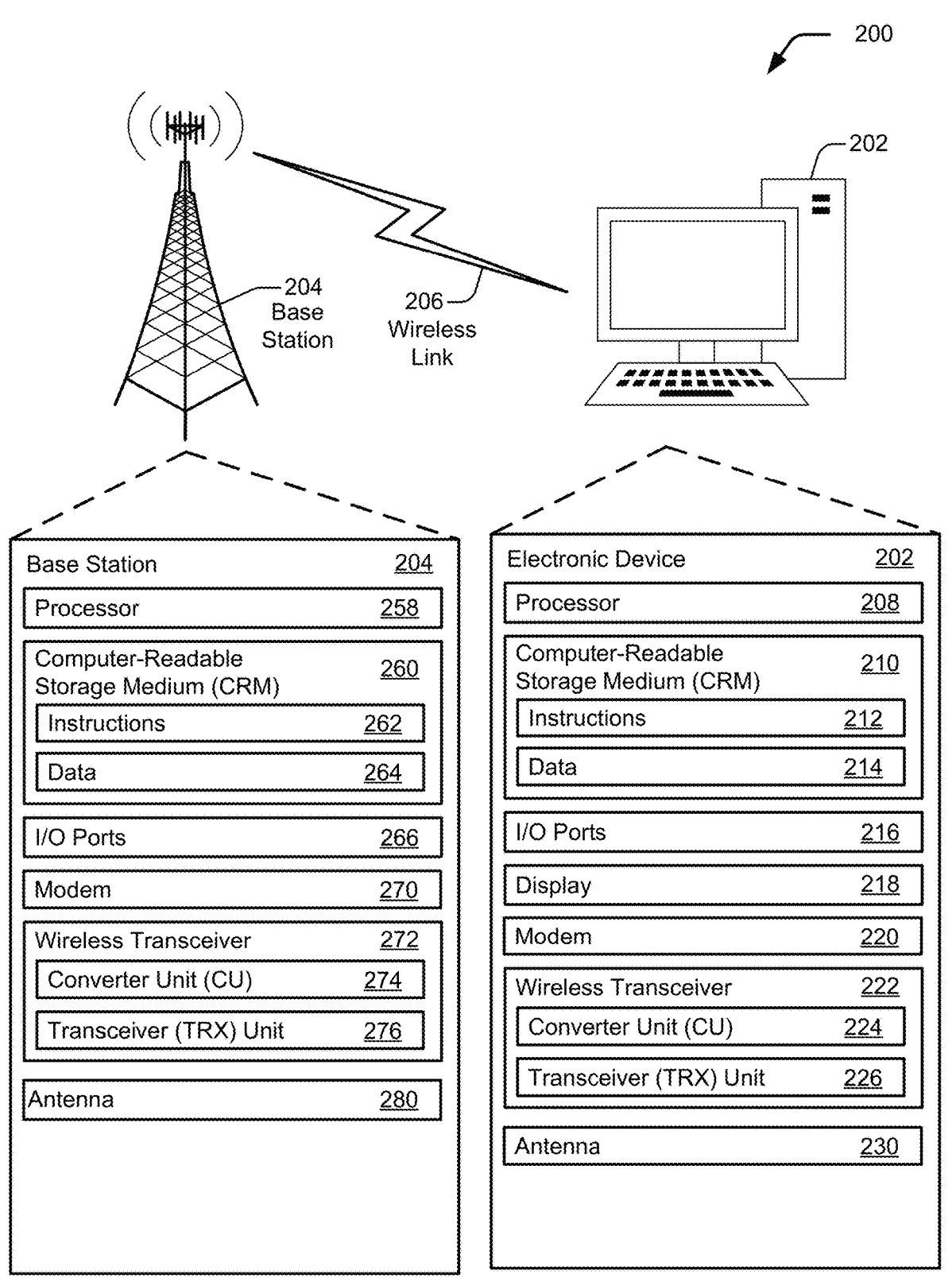
FIG. 2 is a diagram showing a wireless communication system communicating with a wireless device and a base station that can be implemented according to aspects described herein.

FIG. 2 is a diagram illustrating an environment 200 that includes an electronic device 202 and a base station 204. The environment 200 can be part of the system 120, the device 202 can be similar to the device 110, and the base station 204 can be similar to the base stations of FIG. 1. Additionally, while a base station 204 and an electronic device 202 are described, in accordance with aspects described herein, similar wireless links 206 can apply between base stations communicating via OAM multiplexing as described herein, in addition to OAM multiplexing between a base station 204 and an electronic device 202 with a relatively stable position (e.g., a stable position of an antenna array for OAM transmission and reception as described below) where misalignment tracking can be used for correction of misalignments for wireless links 206 where high frequency point to point OAM beams can function between two devices (e.g., such as the base station 204 and the electronic device 202). In the example of FIG. 2, the electronic device 202 may be implemented as any suitable computing or other electronic device, such as a cellular base station, broadband router, access point, cellular or mobile phone, gaming device, navigation device, media device, laptop computer, desktop computer, tablet computer, server, network-attached storage (NAS) device, smart appliance, vehicle-based communication system, Internet-of-Things (IoT) device, and so forth.

The base station 204 communicates with the electronic device 202 via the wireless link 206, which may be implemented as any suitable type of wireless link. Although depicted as a base station tower of a cellular radio network, the base station 204 may represent or be implemented as another device, such as a satellite, cable television head-end, terrestrial television broadcast tower, access point, peer-to-peer device, mesh network node, router, fiber optic line, another electronic device generally, and so forth. Hence, the electronic device 202 may communicate with the base station 204 or another device via a wired connection, a wireless connection, or a combination thereof.

The wireless link 206 can include a downlink of data or control information communicated from the base station 204 to the electronic device 202 and an uplink of other data or control information communicated from the electronic device 202 to the base station 204. The wireless link 206 may be implemented using any suitable communication protocol or standard, such as 3rd Generation Partnership Project Long-Term Evolution (3GPP LTE), 5G New Radio (3GPP 5GNR), IEEE 802.11, IEEE 802.16, Bluetooth™, and so forth.

The electronic device 202 includes a processor 208 and a computer-readable storage medium (CRM 210). The processor 208 may include any type of processor, such as an application processor or a multi-core processor, that is configured to execute processor-executable instructions (e.g., code) stored by the CRM 210. The CRM 210 may include any suitable type of data storage media, such as volatile memory (e.g., random access memory (RAM)), non-volatile memory (e.g., Flash memory), optical media, magnetic media (e.g., disk or tape), and so forth. In the context of this disclosure, the CRM 210 is implemented to store instructions 212, data 214, and other information of the electronic device 202, and thus does not include transitory propagating signals or carrier waves.

The electronic device 202 may also include input/output ports 216 (I/O ports 216) or a display 218. The I/O ports 216 enable data exchanges or interaction with other devices, networks, or users. The I/O ports 216 may include serial ports (e.g., universal serial bus (USB) ports), parallel ports, audio ports, infrared (IR) ports, and so forth. The display 218 can be realized as a screen or projection that presents graphics, e.g.—one or more graphical images, of the electronic device 202, such as for a user interface associated with an operating system, program, or application. Alternatively, or additionally, the display 218 may be implemented as a display port or virtual interface through which graphical content of the electronic device 202 is communicated or presented.

For communication purposes, the electronic device 202 also includes a modem 220, a wireless transceiver 222, and at least one an antenna 230. The wireless transceiver 222 includes a converter unit (CU) 224 and a transceiver (TRX) unit 226. The wireless transceiver 222 provides connectivity to respective networks and other electronic devices connected therewith using RF wireless signals. Additionally, or alternatively, the electronic device 202 may include a wired transceiver, such as an Ethernet or fiber optic interface for communicating over a personal or local network, an intranet, or the Internet. The wireless transceiver 222 may facilitate communication over any suitable type of wireless network described herein.

The modem 220, such as a baseband modem, may be implemented as a system on-chip (SoC) that provides a digital communication interface for data, voice, messaging, and other applications of the electronic device 202. The modem 220 may also include baseband circuitry to perform high-rate sampling processes that can include analog-to-digital conversion (ADC), digital-to-analog conversion (DAC), gain correction, skew correction, frequency translation, and so forth. The modem 220 may also include logic to perform in-phase/quadrature (I/Q) operations, such as synthesis, encoding, modulation, demodulation, and decoding. More generally, the modem 220 may be realized as a digital signal processor (DSP) or a processor that is configured to perform signal processing to support communications via one or more networks. Alternatively, ADC or DAC operations may be performed by a separate component or another illustrated component, such as the wireless transceiver 222.

The wireless transceiver 222 can include circuitry, logic, and other hardware for transmitting or receiving a wireless signal for at least one communication frequency band. In operation, the wireless transceiver 222 can implement at least one radio-frequency transceiver unit to process data and/or signals associated with communicating data of the electronic device 202 via the antenna 230. Generally, the wireless transceiver 222 can include filters, switches, amplifiers, and so forth for routing and processing signals that are transmitted or received via the antenna 230. Generally, the wireless transceiver 222 includes multiple transceiver units (e.g., for different wireless protocols such as WLAN versus WWAN or for supporting different frequency bands or frequency band combinations).

Elements of the electronic device 202 are described above, and the base station 204 can have similar corresponding elements, in addition to any other elements that support base station functionality. The processors 258 can have similar structure and function as the processor 208, and CRM 260 along with instructions 262 and data 264 can have similar structure and function as the CRM 210, the instructions 212, and the data 214. I/O ports 266 and modem 270 can have similar structure and function to the I/O ports 216 and the modem 220 above. A wireless transceiver 272 can include a converter unit 274 and a transceiver unit 276, as well as an antenna 280. The transceiver 272 can include 3GPP standard structures or other communication structures described above for base stations, along with implementations of wireless communication apparatuses for OAM multiplexing communications using an antenna array within antennas 280 configured for OAM multiplexing. Such antennas 280 and communication elements within the wireless transceiver 272 can be used for any number of wireless links in addition to the wireless link 206, including links to other base stations, small cells, macro cells, or other such elements of an environment 200, each of which may include elements similar to those described in FIG. 2 along with OAM devices and functionality for wireless communication as described below.

Figure 3:
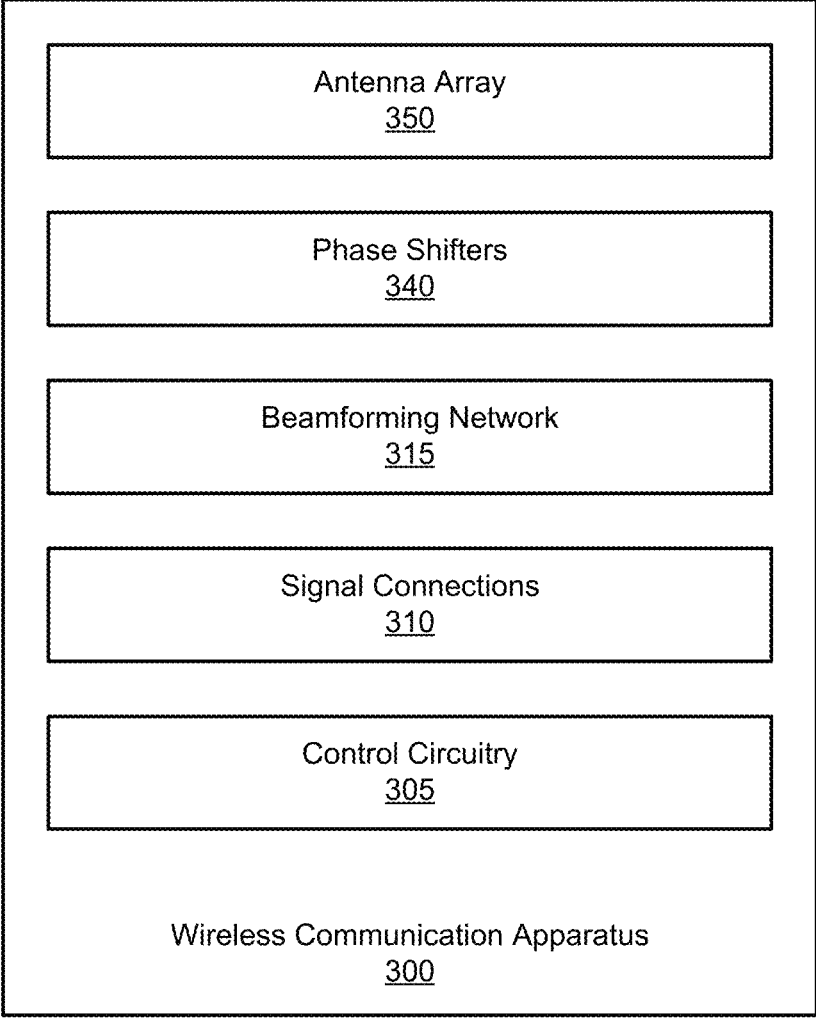
FIG. 3 is a block diagram illustrating aspects of a wireless communication apparatus for OAM beam misalignment correction in accordance with aspects described herein.

FIG. 3 is a block diagram illustrating aspects of a wireless communication apparatus 300 for OAM beam misalignment correction in accordance with aspects described herein. The wireless communication apparatus 300 can be an element of any device or station (e.g., base stations 130, 132, 204 or electronic device 202), as part of wireless communication systems. As described above, mmW or higher frequency wireless communications can use OAM multiplexing for increased data throughput on a given communication band, but misalignment between OAM transmitting antenna arrays and receiving arrays can negatively impact performance. FIG. 3 illustrates an example of a wireless communication apparatus that can include structures for OAM communications that can be measured and corrected using low-impact (e.g., low cost, low power usage, low space usage) system additions for the corrections.

The wireless communication apparatus includes a beamforming network 315. In some implementations, the beamforming network 315 is a Butler Matrix that is made up of couplers and phase shifters. The operation of a Butler Matrix used for the beamforming network 315 to implement OAM communications is described in more detail below. The descriptions below include Butler Matrix implementation details, but other beamforming networks can be used in other implementations, such as beamforming networks that use a Rotman Lens to generate OAM beams or components thereof. Any such beamforming networks 315 can be coupled to phase shifters 340 as described herein to provide small angle corrections for misalignments. Signal connections 310 can provide connections to the beamforming network 315 used to transmit or receive OAM signals. The control circuitry 305 can include both sampling circuitry for generating transmission inputs for the signal connections 310 when the wireless communication apparatus 300 is used for OAM transmission, as well as processing circuitry used to separate out separate OAM channels when the wireless communication apparatus 300 is used to receive OAM signals. Further, the control circuitry 305 can manage signals, measurements, and control adjustments used to identify misalignments between a transmitting device and a receiving device involved in OAM communications. The control circuitry 305 may be included (partially or fully) in the processor 208 or 258 and/or in the modem 220 or 270. The signal connections 310, beamforming network 315, and phase shifters 340 may be included (partially or fully) in the wireless transceiver 222 or 272. The antenna array 350 may be an example of the antenna 230 or 280.

In various implementations, different procedures can be used to determine misalignments. In one implementation, a detector can be placed on each receive antenna after the phase shifter and before the Butler Matrix. A corresponding transmit system will transmit a known pilot sequence with an OAM waveform. The detector will measure the energy, amplitude, and/or phase on each receive antenna element. Such detection can occur in a broadband measurement, or in measurements in a select frequency range or multiple selected frequency ranges. When the phase, amplitude, and/or energy measured by the detectors are known and provided to control circuitry of a device, the control circuitry can perform a search or calculation to determine which offset is a best fit for a received pilot sequence. The identified offset values can be used to control the output phase shifters in accordance with aspects described herein.

In some implementations, a dedicated misalignment antenna can be used to determine misalignments and control output phase shifters. In some implementations, an antenna grid can be used to measure a strongest energy, and correlate the measured energy with an expected OAM beam to determine misalignment. Control circuitry can be used to accept the measured energy from the antenna grid, calculate a misalignment, and calculate offsets for control of output phase shifters. In other implementations, a transmitting system can determine an offset, and transmit a signal to a receiving system indicating a misalignment. The receiving system can determine phase shifter settings based on the transmitted control signal from the transmitting system. In other implementations, other systems can be used to determine the misalignment used to control the output phase shifters.

The beamforming network 315 output connections are coupled to an antenna array 350 via output phase shifters 340. The Beamforming network 315 can handle transmission or reception of OAM signals from the antenna array 350, but does not include mechanisms for correcting misalignments between the antenna array 350 and a corresponding antenna array of a remote wireless communication apparatus communicating with the wireless communication apparatus 300 via OAM beams. Output phase shifters 340 include a phase shift element between each antenna port of the beamforming network 315 and corresponding antenna elements of the antenna array 350. When a misalignment is identified, controllable phase shift values of each of the output phase shifters 340 can be selected to modify a communication signal to compensate for the misalignment, maintaining signal performance. Additional details of OAM beams, Butler Matrix use for OAM communications, misalignment, and correction of misalignment impacts on OAM beams are described below.

Figure 4A:
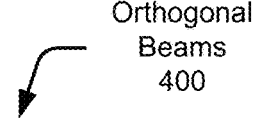
FIG. 4A illustrates aspects of OAM beams in accordance with aspects described herein.

FIG. 4A illustrates aspects of OAM beams 400 in accordance with aspects described herein. FIG. 4A, in particular, shows five different orthogonal OAM beams 400, illustrated as beams 410, 411, 412, 413, and 414. Orbital angular momentum (OAM) multiplexing is a physical method for multiplexing electromagnetic waves using the polarization of light to create mutually orthogonal beams. The illustrations for each of the orthogonal beams includes an isometric view of the polarization over time as an associated Helical Structure 421, a slice of the isometric view onto a two-dimensional plane shown as phase fronts 422, and an intensity projection of the energy composition of each beam in a two dimensional view shown as intensity distributions 423.

OAM multiplexing relies on circular polarization at different rates of change in the polarization. Beams 410 and 411, for example, show clockwise rotation of the polarization of the associated beams over time, with beam 410 having a polarization that changes at twice the frequency of the rotation of the beam 411. The speed or frequency of this rotation can be referred to as the orbital angular momentum of a given beam. Similarly, the beam 413 and the beam 414 have a polarization that rotates in the opposite direction of the polarization of the beams 410 and 411, with the polarization of the beam 414 approximately twice that of the beam 413. The beam 412, by contrast, has a basic polarization that does not rotate, and so the polarization of the beam 412 is zero. The beams can be characterized by:

$$\Phi(\theta) = e^{im\theta} \qquad (1)$$

where $\Phi$ is the amplitude of the signal, m is a current multiple of the base OAM value (e.g., as illustrated in FIG. 4), and $\theta$ is the base phase value at a given time.

By sampling the orbital phase of the different beams at a high enough rate to avoid aliasing, a receiver can receive the beams 410-414 on a single antenna array, and can process the received signals by filtering in accordance with the OAM (e.g., the phase rotation characteristics) for each beam to receive separate data signals communicated on each beam. By having beams with an OAM which is an integer multiple of a base OAM value (e.g., a base phase rotation value), and sampling at a high enough frequency, OAM multiplexing can be achieved that can send significantly more data in a given frequency band than the use of a single OAM signal achieves. FIG. 4A illustrates 5 OAM beams, with the beam 412 having a 0 multiple of the base OAM value, the beam 410 having a −1 multiple, the beam 411 having a +1 multiple, the beam 410 having a +2 multiple, and the beam 414 having a +2 multiple. Multiples of −2 through +2 are illustrated in FIG. 4A, but higher multiple OAM beams can be used in different implementations, so long as the orbital phase is sampled at a sufficiently high rate to avoid phase aliasing and signal loss.

As described herein, an OAM system can be configured for multiple OAM multiplexed channels, but not all multiplexed channels need to be used at any given period. For example, a system supporting seven channels (e.g., m={−3 through +3}), a system may only use certain channels (e.g., the −3, −1, +1, and +3 channels) even though the system supports other channels. In some implementations, such use may be dynamic, for example, based on signaling conditions where a receiver is having trouble distinguishing between adjacent channel beam signals (e.g., between +2 and +3 signals).

Additionally, in Butler Matrix implementations described below, 8 outputs are used, and so symmetrical design will not allow a zero phase (e.g., m=0) beam (e.g., so m={−4, −3, −2, −1, +1, +2, +3, +4} in symmetrical configurations). The use of phase offsets can be used for beams in some implementations to allow a zero OAM beam (e.g., so m={−4, −3, −2, −1, 0, +1, +2, +3,} but a +4 beam or a corresponding symmetrical beam will not be present on one end).

Figure 4B:
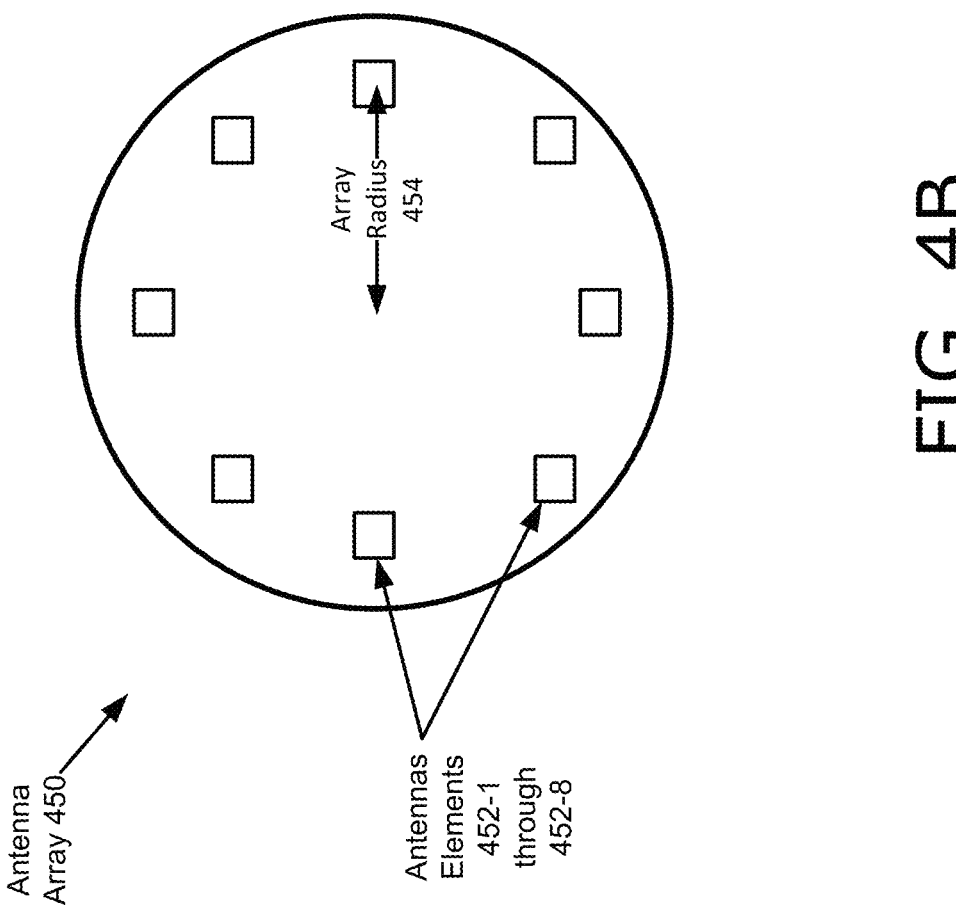
FIG. 4B illustrates aspects of an antenna array for use with OAM beams in accordance with aspects described herein.

FIG. 4B illustrates aspects of an antenna array 450 for use with OAM beams in accordance with aspects described herein. As illustrated in FIG. 4A, OAM beams involve beams with varying phase over time. In order to transmit and receive such OAM beams, an antenna array that can generate and receive beams at different phases is used. The antenna array 450 illustrates a circular array of antenna elements 452-1 through 452-8 configured with an array radius of 454. In order to avoid aliasing of OAM a beam having an OAM multiple of m, the number of antenna elements in an antenna array are designed to be greater than 2m+1. For three OAM beams (e.g., m={−1,+1} without a zero OAM beam as described above), the number of antenna elements is greater than 2(1)+1=3, so 3 or more antenna elements are used. For seven OAM beams (e.g., m={−3, −2, −1, 0, +1, +2, +3}), the number of antenna elements is greater than 2(3)+1=7, so 8 or more antenna elements are used.

While a Butler Matrix cannot create a 0 index in an OAM, an added phase shifter can be used to offset the phase on the antenna elements. Using the added phase, the zero index in the OAM can be created.

Each of the antenna elements 452-1 through 452-8 (e.g., or different numbers of elements depending on the design), is coupled to a corresponding phase shifter (e.g., of the phase shifters 340), and via the corresponding phase shifter, to an antenna port of a Butler Matrix (e.g., the beamforming network 315). The antenna elements and the Butler Matrix are structured to have a one-to-one correlation between Butler Matrix ports and the number of antenna elements (e.g., an 8 input 8 output Butler Matrix will have the 8 outputs coupled to separate antenna elements by separate phase shifters). In other implementations, Butler Matrix outputs can each be tied to two or more antenna elements, depending on RF designs for a particular implementation.

Figure 5:
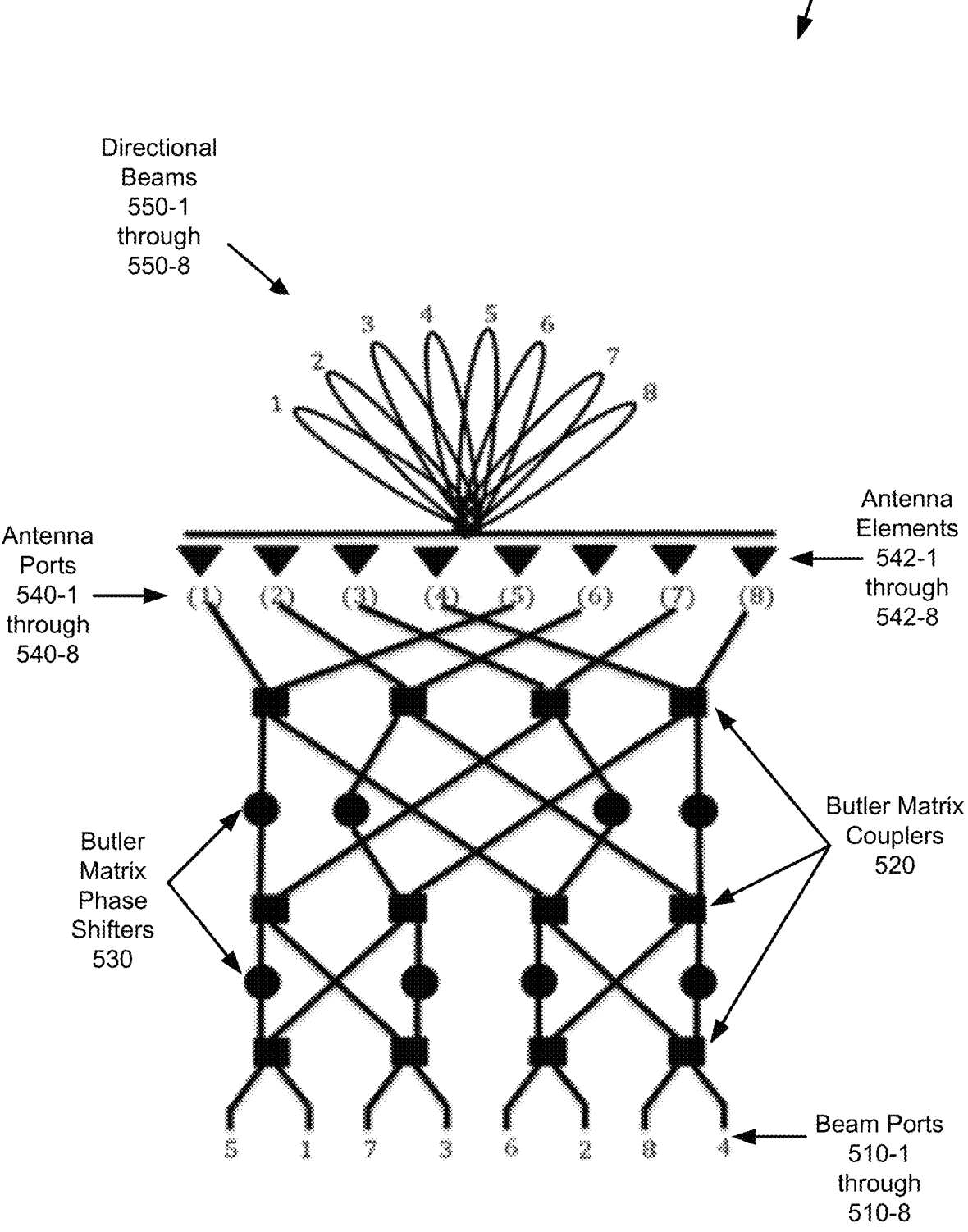
FIG. 5 illustrates aspects of Butler Matrixes associated with aspects described herein.

FIG. 5 illustrates aspects of Butler Matrixes associated with aspects described herein. A Butler Matrix is a passive feeding network with N inputs and N outputs having directional beam steering capabilities for a unified array of N antennas. FIG. 5 shows a traditional linear array communication system 500 with a Butler Matrix structure. The system 500 includes 8 input ports, shown as beam ports 510-1 through 510-8. The Butler Matrix includes a plurality of internal Butler Matrix phase shifters 530 (e.g., kXπ/8 phase shifters) and Butler Matrix couplers 520 (e.g., 3 decibel/90-degree couplers). The network of the phase shifters 530 and couplers 520 in the traditional linear array system 500 generates an array configuration at antenna ports 540-1 through 540-8 such that signals transmitted or received on the corresponding antenna elements 542-1 through 542-8 have directionality illustrated by directional beams 550-1 through 550-8.

Figure 6:
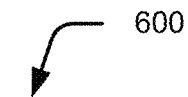
FIG. 6 illustrates aspects of Butler Matrixes associated with aspects described herein.

FIG. 6 illustrates aspects of Butler Matrixes associated with aspects described herein. When a Butler Matrix is coupled to a circular antenna array such as the antenna array 450 illustrated in FIG. 4B, rather than the traditional linear array illustrated in FIG. 5, the beams associated with the Butler Matrix have varying phase values rather than varying directionality (e.g., as illustrated by the directional beams 550-1 through 550-8 associated with the linear array of antenna elements 542-1 through 542-8). The system 600 of FIG. 6 illustrates this difference, where the outputs from the Butler Matrix with an associated antenna array configured for OAM generate different electromagnetic field patterns (e.g., as illustrated in FIG. 4A) with different OAM characteristics, rather than field patterns resulting in different beam directionality as described for the traditional Butler Matrix used with a linear array.

FIG. 6 shows a system 600 with a Butler Matrix structure coupled to a circular antenna array having antenna elements 650-1 through 650-8. The system 600 includes beam ports 610-1 through 610-8. For transmission signals, the beam ports 610-1 through 610-8 accept signal inputs, and processes the signal inputs through the phase shifters 630 and couplers 620 of the Butler Matrix structure (e.g., including kXπ/8 internal phase shifters and 3 dB/90-degree couples as described above) for transmission using the antenna elements 650-1 through 650-8. Control circuitry (e.g., the control circuitry 305) or transceiver circuitry (e.g., the transceivers 222 or 272) can generate signals for the beam ports 610-1 through 610-8 that will be transmitted via the antenna elements 650-1 through 650-8 as multiplexed OAM beams.

Similarly, for receive operations, the antenna elements 650-1 through 650-8 will receive the OAM beams. The signal received by each antenna element will be communicated through the couplers 620 and the phase shifters 630 of the Butler Matrix, with corresponding signals output at the Beam Ports 610-1 through 610-8. Control circuitry or processing circuitry of a transceiver can then further process the signals output at the beam ports 610-1 through 610-8 to process the independent data streams from each of the orthogonal OAM beams received at the antenna array.

Figure 7:
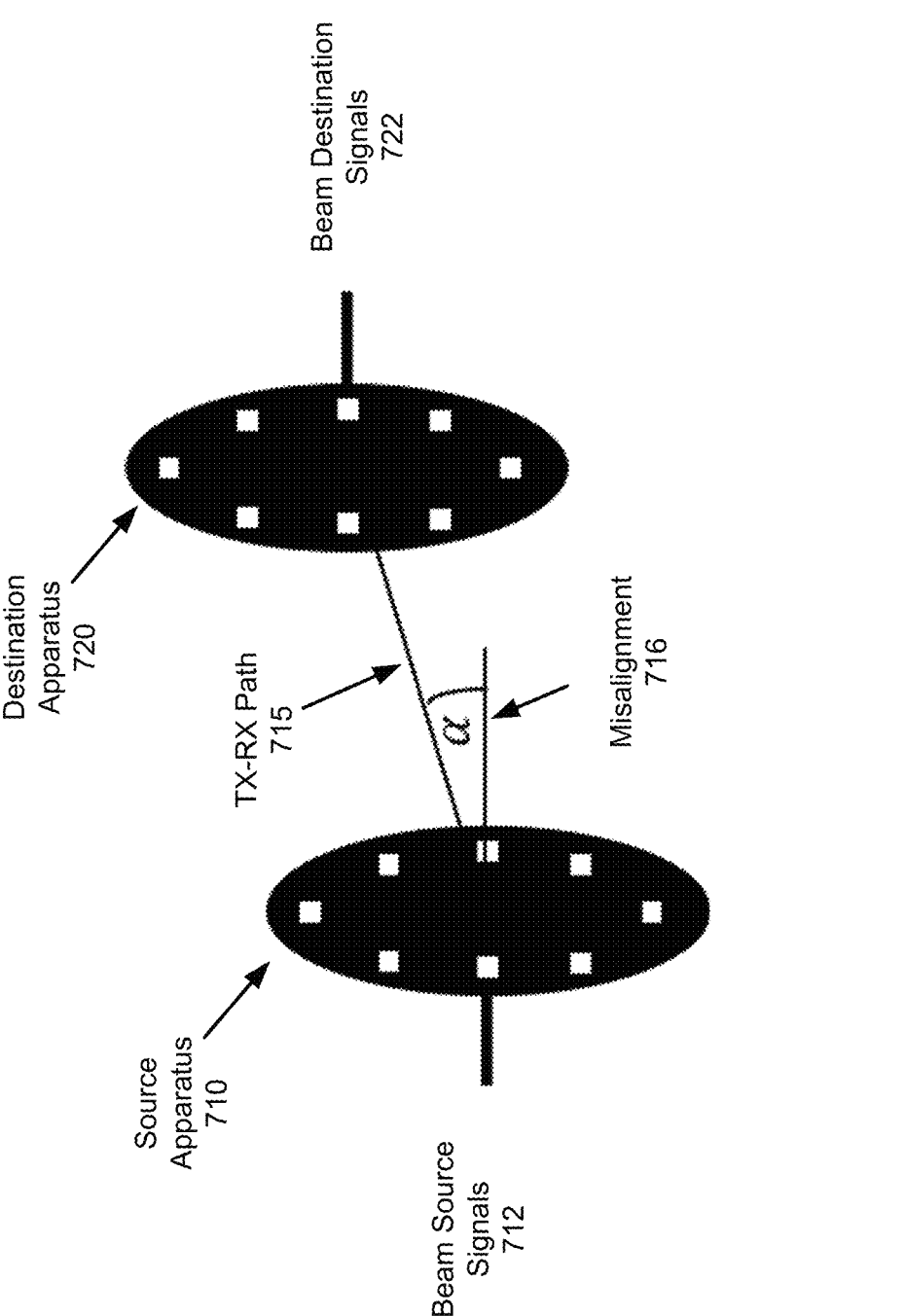
FIG. 7 illustrates aspects of a wireless communication apparatus for OAM beam misalignment correction in accordance with aspects described herein.

FIG. 7 illustrates aspects of a wireless communication apparatus for OAM beam misalignment correction in accordance with aspects described herein. In any communication, the OAM transmit functionality described above will be performed by one device, and another remote device will perform a corresponding receive functionality. For OAM communications, this involves a source apparatus 710 (e.g., the transmitting device with beam source signals 712) and a destination apparatus 720 (e.g., the receive device). Because the polarization described above for OAM beams is directional, the directionality of the transmit (TX)-receive (RX) path impacts the ability of the destination apparatus 720 to identify the OAM beam signals. In a system having two circular antenna arrays with circuitry for OAM transmission and reception (e.g., two instances of the system 600, with one for the source apparatus and one for the destination apparatus), the alignment between the circular antenna arrays (e.g., the antenna array 450 or the antenna elements 650-1 through 650-8, for example), will impact beam destination signals 722 received at the destination apparatus 720.

The misalignments can, for example, be off-axis (e.g., horizontal or vertical) misalignment, nonparallel misalignment (e.g., when the array planes for the Tx and Rx elements are not parallel), and rotational mismatch (e.g., where corresponding antenna elements are rotated out of phase relative to each other for the configuration of a given OAM beam, as described further below).

Figure 8:
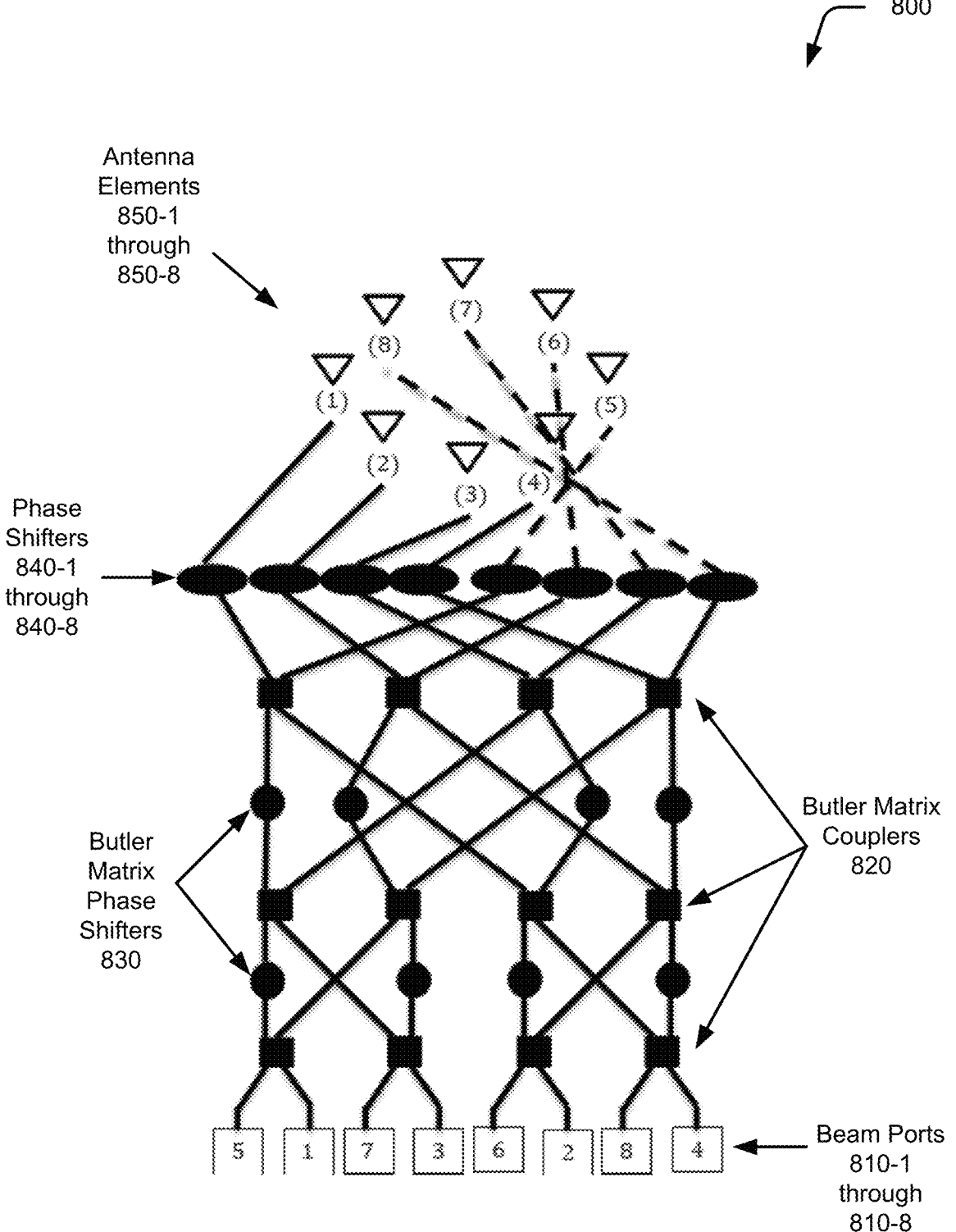
FIG. 8 illustrates aspects OAM beam misalignment correction in accordance with aspects described herein.

FIG. 8 illustrates aspects of OAM beam misalignment correction in accordance with aspects described herein. The illustrated wireless communication apparatus 800 of FIG. 8 includes a Butler Matrix as described above, with beam ports 810-1 through 810-8 for communicating signals with processing circuitry of a device, phase shifters 830 and couplers 820 internal to the Butler Matrix, and antenna elements 850-1 through 850-8 of a (circular) antenna array.

The wireless communication apparatus 800, however, additionally includes output phase shifters 840-1 through 840-8 (e.g., similar to the output phase shifters 340 described above). The phase shifters are tunable, and can be configured with phase shift values determined from sensing measurements associated with the projection of each antenna element on a Tx-Rx line to a corresponding antenna element of the other device in a communication. The tuning values can be used to compensate for aspects of the misalignment as described above in FIG. 7. As noted above, while a Butler Matrix is illustrated, a different beamforming network (e.g., a Rotman lens) may be used instead. The Butler Matrix may be an example of the beamforming network 315 (FIG. 3), the phase shifters 830 may be an example of the phase shifters 340, the antenna elements 850 may be an example of the antenna array 350, and the beam ports 810 may be an example of the signal connections 310. An 8×8 Butler matrix is illustrated in the example of FIG. 8, but other sizes of Butler Matrix (e.g., 4×4, 16×16, etc.) may be used for antenna arrays having fewer or a greater number of elements. Further, while a circular array of antennas is illustrated in FIG. 8, other configurations may be implemented. For example, other beamforming networks may be used with arrays having a different configuration. The phase shifters 840 are labeled as output phase shifters herein, but it will be understood that the phase shifters 840 may receive signals output from a beamforming network (e.g., the Butler Matrix) or may provide input signals to the beamforming network (for example, when the apparatus 800 is used to receive an OAM beam instead of being used to transmit an OAM beam).

Since the mismatch for each multiplexed OAM beam between a given Tx antenna array and a corresponding Rx antenna array is common, the mismatch can be corrected with the phase shifters which are common for the Butler Matrix beams. For example, the misalignment 716 illustrated in FIG. 7 can be characterized as follows:

$$a = \left[ e^{-W_1}, e^{-W_2}, \ldots, e^{-W_N} \right] \tag{2}$$

and $$W_n = \frac{2\pi R}{\lambda} \cos\left( \frac{2\pi(n-1)}{N} - \frac{\pi}{2} \right) \sin\alpha \tag{3}$$

where α is the angle between the Tx array center and the Rx array center, R is the predefined radius of the circular formation of the elements of the antenna array for the system performing the calculation (e.g., the array radius 454), n is the antenna element index (e.g., where each antenna element such as antenna elements 650-1 through 650-8 has an associated index), N is the number of antennas, and a is the implemented phase vector on the antennas. For the radius value R, if transmit and receive systems in a particular implementation both apply beam misalignment correction, then each (e.g., both the transmit and receive systems) may calculate the associated radius for the corresponding system (e.g., the transmit system for the radius of the transmit array, and the receive system for the radius of the receive array).

Sensing signals can be managed by control circuitry coupled to such an apparatus and used to identify the misalignment between a Tx antenna array and an Rx antenna array. Results and data from such sensing signals can be used for calculating an alignment for each pair of antenna elements (e.g., between Tx and Rx antenna arrays) to determine the phase shift values for each phase shifter used to compensate for the calculated misalignment. The calculated phase shift values can then be provided to the phase shifters 840-1 through 840-8 to provide small angle corrections to the OAM beams, which improve the quality of the signal at the destination apparatus.

In some cases, the systems described for OAM multiplexing communications are, as described above, specific for an orientation and direction of a Tx-Rx path (e.g., the Tx-Rx path 715), and so such OAM communications can be suited for devices fixed in position (e.g., for front haul or back haul wireless links). A common such device is an apparatus of a base station in a fixed position on a pole. While two such devices mounted on poles and configured to communicate with each other have positions and directionality that is largely fixed, factors such as wind, temperature, atmospheric conditions, and other such variables can modify the Tx-Rx path sufficient to degrade the associated OAM multiplexing channel performance. Phase shifters such as the phase shifters 840-1 through 840-8 can provide small angle corrections in response to misalignment sensing signals generated between the Tx and Rx devices. Additionally, since the above-described factors impacting the angle change over time, control circuitry can be used to periodically measure the misalignment and generate updated phase adjustment values to compensate for the measured misalignment. In some implementations, a threshold performance value is used to trigger an updated misalignment measurement, such that a misalignment measurement is performed with the system performance falls below a threshold level (e.g., when errors become excessive). Such control systems can be used to avoid unnecessary updates to misalignment compensation when a small misalignment has a negligible impact on communication performance, while also providing an option for dynamic channel improvement based on compensating for misalignments when overall channel performance falls to a level that impacts operation.

The use of such phase shifters improves the operation of the associated apparatus by improving signal performance in the OAM communications, while adding low complexity elements to the apparatus, particularly when compared with the alternate solution of using larger antenna arrays and using beam steering implemented in the antenna array signals.

In various implementations, the phase shifters 840-1 through 840-8 can be implemented as different types of phase shifters. In some implementations, active phase shifters such as varactors, Cartesian phase shifters, micro-electro-mechanical system (MEMS) phase shifters, ferrite phase shifters, or other such active (e.g., providing signal amplification) phase shifters can be used. Varactor phase shifters can be implemented with sensitive phase tuning characteristics (e.g., analog phase shift functionality with soft or finely adjustable phase shift values) to provide accurate compensation for the misalignment described above.

The above examples include Butler Matrixes with 8 inputs and 8 outputs. In other implementations, other structures, such as 16 input and 16 output Butler Matrixes with corresponding arrays of 16 antenna elements and associated (e.g., 16) phase shifters for each matching Butler Matrix output and antenna element pair. Similarly, in other implementations, other numbers can be used for the N×N design of a particular implementation.

Additionally, while the aspects describe above illustrate OAM beams formed by beamforming networks based on Butler Matrix networks, other such structures, such as beamforming networks based on Rotman Lens structures, can be used with added phase shift element in accordance with the aspects described herein.

As described above, the misalignment impacting signal performance is not simply associated with alignment of the center of the array as a whole, but also for elements of the array. OAM signals, for example, relate to the rotational orientation of the elements within the array (e.g., arrays with associated index values in a Tx array that will correspond to a given index value in the Rx array in order to separate the multiplexed signals). Spatial misalignment for antenna elements can be identified on a per element bases based on the difference of the projection of each element on the line that combines the Tx and the Rx space. As illustrated above, such spatial misalignments can be dependent on per element positioning, and varactor phase shifter implementations can include sufficient sensitivity to allow phase shift values to fine tune the adjustments for such compensation.

In other implementations, passive phase shifters can be used to reduce device complexity and power usage. Such passive phase shifters used for the phase shifters 840-1 through 840-8 can, for example, include switched delay lines, high-pass low-pass filter delay elements, Schiffman phase shifters, reflective-type phase shifters, loaded lines, and other such passive phase shift elements. In some implementations, combinations of any such phase shifters described above can be used to balance performance with power usage and device complexity. The phase shifters may be configured to provide a tunable phase shift (e.g., based on instruction from the control circuitry 305), for example as opposed to a fixed phase shift provided by a phase shifter within the Butler Matrix.

Wireless communication apparatuses described herein can maintain reciprocity for both Tx and Rx operation, such that a single apparatus (e.g., the wireless communication apparatus 800) can perform both transmit and receive operations allowing two-way OAM multiplexed uplink and downlink communications with the same apparatus. In some implementations, the phase shifters used for fine control misalignment compensation are selected to facilitate such bidirectional reciprocity.

In addition to the spatial mismatch described above, rotational mismatch can be handled by a system using differential phase offsets on adjacent antenna elements. When rotational offsets exist between Tx and Rx antenna arrays, potential null signals can be generated from associated rotation errors. By combining the phase shift value compensations described above using phase shifters in a wireless communication apparatus from OAM multiplexing communications with differential phase offsets (e.g., offsetting the phase values illustrated in FIG. 4A), such rotational errors can also be addressed using the described aspects.

FIG. 9 is a flow diagram describing an example of the operation of a method 900 for operation of a wireless communication apparatus with OAM multiplexing functionality in accordance with aspects described herein. In some aspects, the described operations can be performed by a device including a memory and processing circuitry coupled to the memory and configured to perform the operations of the method 900. In some aspects, the method 900 can be embodied as instructions stored in a non-transitory computer readable storage medium (e.g., 210 or 260) that, when executed by processing circuitry (e.g., control circuitry 305) of a device, cause the device to perform the operations of method 900 described below. The blocks in the method 900 can be performed in or out of the order shown, and in some embodiments, can be performed at least in part in parallel.

Method 900 includes block 902, which involves initiating, by a wireless communication apparatus, a communication link with a remote wireless communication apparatus. In some aspects the wireless communication apparatus and the remote wireless communication apparatus are configured to communicate using orbital angular momentum (OAM) beams. In some aspects, the wireless communication apparatus comprises a Butler Matrix or other beamforming network, an antenna array, and a plurality of phase shifters coupling antenna ports of the Butler Matrix or other beamforming network to corresponding elements of the antenna array. In other aspects, any other such structures or device elements may be used for correcting OAM beam misalignment as described herein.

Method 900 includes block 904, which involves measuring, by the wireless communication apparatus, a misalignment between the antenna array of the wireless communication apparatus, and an antenna array of the remote wireless communication apparatus.

Method 900 includes block 906, which involves selecting, by the wireless communication apparatus, phase shift values for the plurality of phase shifters to compensate for the misalignment.

Method 900 includes block 908, which involves communicating a plurality of OAM beams between the wireless communication apparatus and the remote wireless communication apparatus using the phase shift values.

FIG. 10 is a functional block diagram of a wireless communication apparatus configured for OAM multiplexing in accordance with aspects described herein. The apparatus 1000 comprises means 1002 for initiating a communication link with a remote wireless communication apparatus using orbital angular momentum (OAM) beams. The apparatus 1000 further comprises means 1004 for measuring (e.g., by the wireless communication apparatus or a component of apparatus 1000), a misalignment between the antenna array of the wireless communication apparatus, and an antenna array of the remote wireless communication apparatus. The apparatus 1000 additional includes means 1006 for selecting, by the wireless communication apparatus, phase shift values for the plurality of phase shifters to compensate for the misalignment. The apparatus 1000 further includes means 1008 and means for communicating a plurality of OAM beams between the wireless communication apparatus and the remote wireless communication apparatus using the phase shift values.

Devices, networks, systems, and certain means for transmitting or receiving signals described herein may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles, and will be referred to herein as "sub-7 GHz". A similar nomenclature issue sometimes occurs with regard to FR2, which is often referred to (interchangeably) as a "millimeter wave" (mmW) band in documents and articles, despite including frequencies outside of the extremely high frequency (EHF) band (30 GHz-300 GHz) which is identified by the International Telecommunications Union (ITU) as a "mmWave" or mmW band. Unless specifically stated otherwise, it should be understood that the term "mmWave", mmW, or the like if used herein may broadly represent frequencies that may include mid-band frequencies, may be within FR2, or may be within the EHF band.

The circuit architecture described herein described herein may be implemented on one or more ICs, analog ICs, mmWICs, mixed-signal ICs, ASICs, printed circuit boards (PCBs), electronic devices, etc. The circuit architecture described herein may also be fabricated with various IC process technologies such as complementary metal oxide semiconductor (CMOS), N-channel MOS (NMOS), P-channel MOS (PMOS), bipolar junction transistor (BJT), bipolar-CMOS (BiCMOS), silicon germanium (SiGe), gallium arsenide (GaAs), heterojunction bipolar transistors (HBTs), high electron mobility transistors (HEMTs), silicon-on-insulator (SOI), etc.

An apparatus implementing the circuit described herein may be a stand-alone device or may be part of a larger device. A device may be (i) a stand-alone IC, (ii) a set of one or more ICs that may include memory ICs for storing data and/or instructions, (iii) an RFIC such as an RF receiver (RFR) or an RF transmitter/receiver (RTR) or corresponding mmW elements, (iv) an ASIC such as a mobile station modem (MSM), (v) a module that may be embedded within other devices, (vi) a receiver, cellular phone, wireless device, handset, or mobile unit, (vii) etc.

Figure 11:
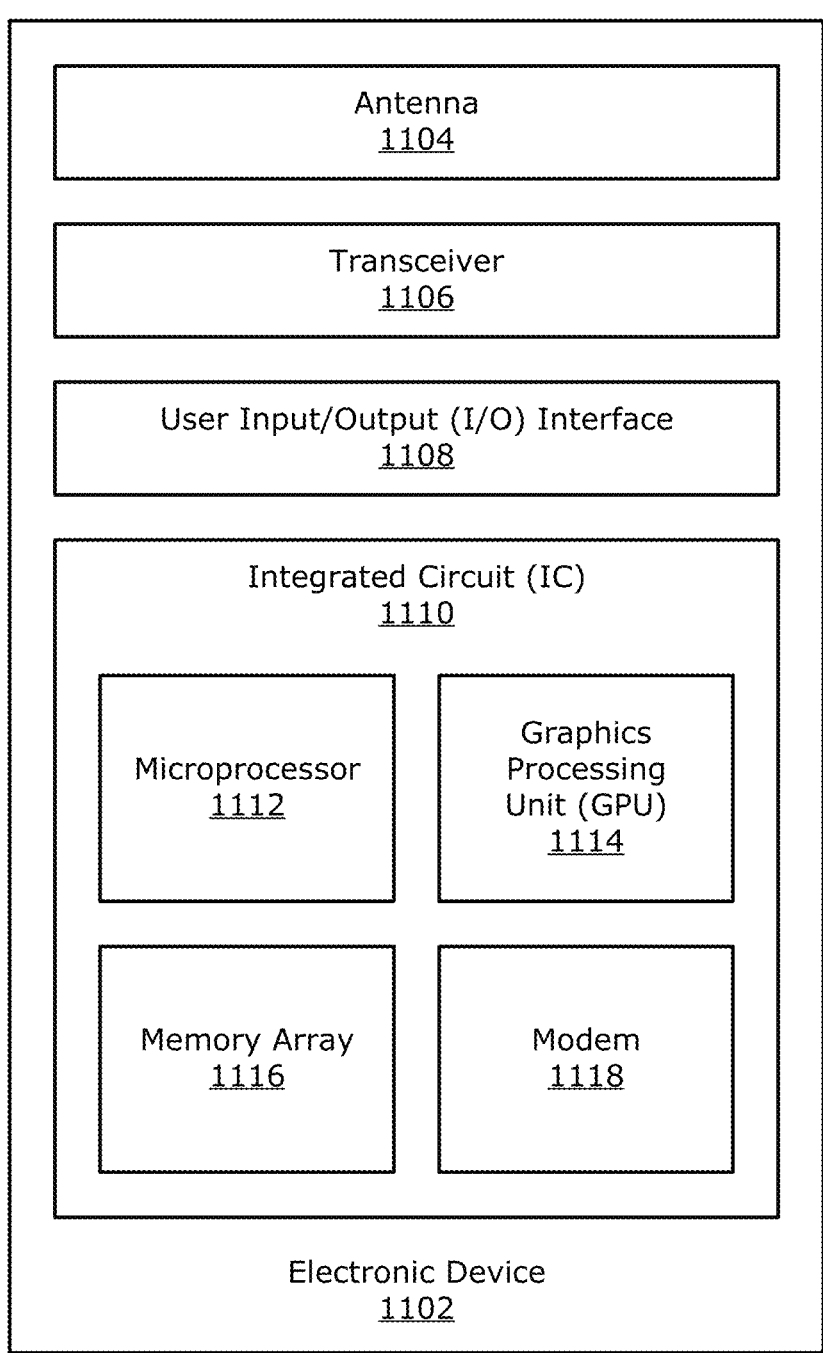
FIG. 11 is a diagram of an electronic device that can be used with aspects of the present disclosure.

FIG. 11 is a diagram illustrating an exemplary electronic device 1102, which includes a transceiver 1106 that can include and/or implement misalignment correction of OAM beams. As shown, the electronic device 1102 includes an antenna 1104, an integrated circuit 1110, and a user input/output (I/O) interface 1108 which may be used to implement misalignment correction of OAM beams along with the transceiver 1106. Illustrated examples of the integrated circuit 1110, or cores thereof, include a microprocessor 1112, a graphics processing unit (GPU) 1114, a memory array 1116, and a modem 1118. Each component can be operably coupled to another component, such as the GPU 1114 being operably coupled to the user I/O interface 1108.

The electronic device 1102 can be a mobile or battery-powered device or a fixed device that is designed to be powered by an electrical grid. Examples of the electronic device 1102 include a base station (e.g., the base station 130, 132, 204, etc.), an electronic device (e.g., the wireless device 110, the electronic device 202, etc.), a server computer, a network switch or router, a blade of a data center, a personal computer, a desktop computer, a notebook or laptop computer, a tablet computer, a smart phone, an entertainment appliance, or a wearable electronic device such as a smartwatch, intelligent glasses, or an article of clothing. An electronic device 1102 can also be a device, or a portion thereof, having embedded electronics. Examples of the electronic device 1102 with embedded electronics include a passenger vehicle, industrial equipment, a refrigerator or other home appliance, a drone or other unmanned aerial vehicle (UAV), or a power tool.

For an electronic device with a wireless capability, the electronic device 1102 includes an antenna 1104 that is coupled to a transceiver 1106 to enable reception or transmission of one or more wireless signals. The integrated circuit 1110 may be coupled to the transceiver 1106 to enable the integrated circuit 1110 to have access to received wireless signals or to provide wireless signals for transmission via the antenna 1104. The electronic device 1102 as shown also includes at least one user I/O interface 1108. Examples of the user I/O interface 1108 include a keyboard, a mouse, a microphone, a touch-sensitive screen, a camera, an accelerometer, a haptic mechanism, a speaker, a display screen, or a projector. The transceiver 1106 can correspond to, for example, the wireless transceiver 222 or the wireless transceiver 272 of FIG. 2, and can include an RF power sensor, in accordance with examples described herein.

The integrated circuit 1110 may comprise, for example, one or more instances of a microprocessor 1112, a GPU 1114, a memory array 1116, a modem 1118, and so forth. The microprocessor 1112 may function as a central processing unit (CPU) or other general-purpose processor. Some microprocessors include different parts, such as multiple processing cores, that may be individually powered on or off. The GPU 1114 may be especially adapted to process visual related data for display, such as video data images. If visual-related data is not being rendered or otherwise processed, the GPU 1114 may be fully or partially powered down. The memory array 1116 stores data for the microprocessor 1112 or the GPU 1114. Example types of memory for the memory array 1116 include random access memory (RAM), such as dynamic RAM (DRAM) or static RAM (SRAM); flash memory; and so forth. If programs are not accessing data stored in memory, the memory array 1116 may be powered down overall or block-by-block. The modem 1118 demodulates a signal to extract encoded information or modulates a signal to encode information into the signal. If there is no information to decode from an inbound communication or to encode for an outbound communication, the modem 1118 may be idled to reduce power consumption. The integrated circuit 1110 may include additional or alternative parts than those that are shown, such as an I/O interface, a sensor such as an accelerometer, a transceiver or another part of a receiver chain, a customized or hard-coded processor such as an application-specific integrated circuit (ASIC), and so forth.

The integrated circuit 1110 may also comprise a system on chip (SoC). An SoC may integrate a sufficient number of different types of components to enable the SoC to provide computational functionality as a notebook computer, a mobile phone, or another electronic apparatus using one chip, at least primarily. Components of an SoC, or an integrated circuit 1110 generally, may be termed cores or circuit blocks. Examples of cores or circuit blocks include, in addition to those that are illustrated in FIG. 11, a voltage regulator, a main memory or cache memory block, a memory controller, a general-purpose processor, a cryptographic processor, a video or image processor, a vector processor, a radio, an interface or communications subsystem, a wireless controller, or a display controller. Any of these cores or circuit blocks, such as a central processing unit or a multimedia processor, may further include multiple internal cores or circuit blocks.

Although selected aspects have been illustrated and described in detail, it will be understood that various substitutions and alterations may be made therein without departing from the spirit and scope of the present invention, as defined by the following claims.

Illustrative aspects of the present disclosure include, but are not limited to:

Aspect 1. A wireless communication apparatus, comprising: a beamforming network comprising a plurality of antenna ports and a plurality of beam ports, wherein the plurality of antenna ports are positioned for communicating orbital angular momentum (OAM) beams; a plurality of output phase shifters, wherein each output phase shifter is coupled to a corresponding antenna port of the plurality of antenna ports; and control circuitry coupled to the plurality of output phase shifters and configured to select phase shift values for the plurality of output phase shifters to correct a misalignment of the OAM beams.

Aspect 2. The wireless communication apparatus of Aspect 1, wherein the beamforming network is a Butler Matrix.

Aspect 3. The wireless communication apparatus of any of Aspects 1 to 2, further comprising a plurality of antenna elements, wherein the Butler matrix comprises an output electrically coupled to the plurality of antenna elements.

Aspect 4. The wireless communication apparatus of any of Aspects 1 to 3, wherein the beamforming network is a Rotman lens.

Aspect 5. The wireless communication apparatus of any of Aspects 1 to 4, further comprising: an antenna array comprising a plurality of antenna elements, wherein each antenna element of the plurality of antenna elements is coupled to the corresponding antenna port of the plurality of antenna ports.

Aspect 6. The wireless communication apparatus of any of Aspects 1 to 5, wherein the plurality of antenna elements are positioned in a circular formation having a predefined radius, with a corresponding position for each antenna element associated with an orbital phase of the OAM beams.

Aspect 7. The wireless communication apparatus of any of Aspects 1 to 6, wherein the control circuitry is configured to measure the misalignment of the OAM beams in communication with a remote wireless communication apparatus.

Aspect 8. The wireless communication apparatus of any of Aspects 1 to 7, wherein the misalignment comprises one or more of an off-axis misalignment, a nonparallel misalignment, and a rotation mismatch alignment.

Aspect 9. The wireless communication apparatus of any of Aspects 1 to 8, wherein the plurality of output phase shifters comprise varactor phase shifters tunable with the phase shift values determined by a projection of each antenna elements on a transmission-reception line to a corresponding antenna element of a remote wireless communication apparatus.

Aspect 10. The wireless communication apparatus of Aspect 9, wherein the control circuitry is configured to measure the misalignment by calculating an alignment for each pair of antenna elements to determine the phase shift values for each phase shifter associated with the corresponding antenna element and antenna port.

Aspect 11. The wireless communication apparatus of any of Aspects 1 to 8, wherein the plurality of output phase shifters comprise passive phase shifters.

Aspect 12. The wireless communication apparatus of any of Aspects 1 to 8, wherein the plurality of output phase shifters comprise bidirectional phase shifters for providing reciprocal phase adjustments to transmission OAM beams and received OAM beams of the OAM beams.

Aspect 13. The wireless communication apparatus of any of Aspects 1 to 12, further comprising transceiver circuitry coupled to the plurality of beam ports, and configured to provide a plurality of OAM beams to the plurality of beam ports, wherein each beam port of the plurality of beam ports receives a signal associated with samples of the plurality of OAM beams at a set orbital phase corresponding to each beam port.

Aspect 14. The wireless communication apparatus of Aspect 13, wherein the samples of the plurality of OAM beams are sampled at a rate sufficient to avoid phase aliasing between the OAM beams.

Aspect 15. The wireless communication apparatus of any of Aspects 1 to 14, wherein the misalignment comprises a rotation mismatch, and wherein the control circuitry is configured to adjust a differential phase of a signal for each beam port based on the rotation mismatch.

Aspect 16. A wireless communication apparatus, comprising: a Butler matrix comprising a plurality of antenna ports and a plurality of beam ports, wherein the plurality of antenna ports are positioned for communicating orbital angular momentum (OAM) beams; and a plurality of output phase shifters, wherein each output phase shifter is coupled to a corresponding antenna port of the plurality of antenna ports, and wherein phase shift values for the plurality of output phase shifters are selected to correct a misalignment of the OAM beams.

Aspect 17. The wireless communication apparatus of Aspect 16, further comprising a plurality of antenna elements coupled to each antenna port of the plurality of antenna ports.

Aspect 18. The wireless communication apparatus of any of Aspects 16 to 17, wherein the plurality of output phase shifters comprise passive phase shifters.

Aspect 19. The wireless communication apparatus of any of Aspects 16 to 17, wherein the plurality of output phase shifters comprise bidirectional phase shifters for providing reciprocal phase adjustments to transmission OAM beams and received OAM beams of the OAM beams.

Aspect 20. The wireless communication apparatus of any of Aspects 16 to 19, further comprising: control circuitry; and transceiver circuitry coupled to the control circuitry and the plurality of beam ports, wherein the transceiver circuitry is configured to provide a plurality of OAM beams to the plurality of beam ports, and wherein each beam port of the plurality of beam ports receives a corresponding control signal from the control circuitry, wherein each corresponding control signal is associated with samples of the plurality of OAM beams at a set orbital phase corresponding to each beam port.

Aspect 21. The wireless communication apparatus of Aspect 20, wherein the samples of the plurality of OAM beams are sampled to avoid phase aliasing between the OAM beams.

Aspect 22. A wireless communication apparatus comprising: transceiver circuitry configured to generate signals for a plurality of orbital angular momentum (OAM) beams; a plurality of beam ports coupled to the transceiver circuitry to communicate the plurality of OAM beams; a plurality of antenna ports, wherein each antenna port is associated with a corresponding orbital phase of the plurality of OAM beams; a plurality of three decibel 90-degree couplers and internal phase shifters configured to couple the plurality of beam ports to the plurality of antenna ports; and a plurality of antenna elements positioned in a circular array, with each element coupled to a corresponding antenna port of the plurality of antenna ports.

Aspect 23. The wireless communication apparatus of Aspect 22, further comprising: control circuitry coupled to the transceiver circuitry, wherein the control circuitry provides control signals to the transceiver circuitry, and wherein the control signals are associated with a set orbital phase for a corresponding beam port of the plurality of beam ports.

Aspect 24. The wireless communication apparatus of Aspect 23, wherein the control circuitry is further configured to measure a misalignment of the plurality OAM beams in communication with a remote wireless communication apparatus.

Aspect 25. The wireless communication apparatus of any of Aspects 22 to 24, wherein the misalignment comprises an off-axis misalignment.

Aspect 26. The wireless communication apparatus of any of Aspects 22 to 25, wherein the internal phase shifters comprise bidirectional phase shifters for providing reciprocal phase adjustments to transmission OAM beams and received OAM beams of the OAM beams.

Aspect 27. The wireless communication apparatus of any of Aspects 22 to 26, wherein the internal phase shifters comprise varactor phase shifters tunable with phase shift values determined by a projection of each antenna elements on a transmission-reception line to a corresponding antenna element of a remote wireless communication apparatus, and wherein the control circuitry is configured to measure the misalignment by calculating an alignment for each pair of antenna elements to determine the phase shift values for each phase shifter associated with the corresponding antenna element and antenna port.

Aspect 28. A method comprising: initiating, by a wireless communication apparatus, a communication link with a remote wireless communication apparatus, wherein the wireless communication apparatus and the remote wireless communication apparatus are configured to communicate using orbital angular momentum (OAM) beams, and wherein the wireless communication apparatus comprises a Butler Matrix, an antenna array, and a plurality of phase shifters coupling antenna ports of the Butler Matrix to corresponding elements of the antenna array; measuring, by the wireless communication apparatus, a misalignment between the antenna array of the wireless communication apparatus, and an antenna array of the remote wireless communication apparatus; selecting, by the wireless communication apparatus, phase shift values for the plurality of phase shifters to compensate for the misalignment; and communicating a plurality of OAM beams between the wireless communication apparatus and the remote wireless communication apparatus using the phase shift values.

Aspect 29. The method of Aspect 28, wherein measuring, by the wireless communication apparatus, the misalignment between the antenna array of the wireless communication apparatus and the antenna array of the remote wireless communication apparatus comprises: receiving misalignment calculations from the remote wireless communication apparatus; and performing a set of misalignment measurements at the wireless communication apparatus.

Aspect 30. The method of any of Aspects 28 to 29, wherein measuring, by the wireless communication apparatus, the misalignment between the antenna array of the wireless communication apparatus and the antenna array of the remote wireless communication apparatus comprises: performing calculations for a rotation mismatch; performing calculations for an off-axis misalignment; and performing calculations for a nonparallel misalignment.

Aspect 31. A method for performing operations according to any of aspects 1 to 27.

Aspect 32. A wireless communication apparatus comprising: means for initiating a communication link with a remote wireless communication apparatus using orbital angular momentum (OAM) beams, means for measuring, by the wireless communication apparatus, a misalignment between the antenna array of the wireless communication apparatus, and an antenna array of the remote wireless communication apparatus; means for selecting, by the wireless communication apparatus, phase shift values for the plurality of phase shifters to compensate for the misalignment; and means for communicating a plurality of OAM beams between the wireless communication apparatus and the remote wireless communication apparatus using the phase shift values.

Aspect 33. An apparatus comprising means for performing operations or configurations according to any of aspects 1 to 30.

Aspect 34: A non-transitory computer readable storage medium comprising instructions that, when executed by processing circuitry of a device, cause the device to perform operations or configurations according to any of aspects 1 to 30.

What is claimed is:

1. A wireless communication apparatus, comprising:
a beamforming network comprising a plurality of antenna ports and a plurality of beam ports, wherein the plurality of antenna ports are coupled to communicate orbital angular momentum (OAM) beams;
a plurality of output phase shifters, wherein each output phase shifter is coupled to a corresponding antenna port of the plurality of antenna ports; and
control circuitry coupled to the plurality of output phase shifters and configured to correct a misalignment of the OAM beams, wherein the misalignment is based on a rotation mismatch between antenna elements associated with the OAM beams, and wherein to correct the misalignment of the OAM beams, the control circuitry is configured to:
select phase shift values for the plurality of output phase shifters; and
adjust a differential phase of a signal for at least one beam port of the plurality of beam ports based on the rotation mismatch.

2. The wireless communication apparatus of claim 1, wherein the beamforming network is a Butler Matrix.

3. The wireless communication apparatus of claim 2, further comprising a plurality of antenna elements, wherein the plurality of antenna ports of the Butler Matrix are electrically coupled to the plurality of antenna elements via the plurality of output phase shifters.

4. The wireless communication apparatus of claim 1, wherein the beamforming network is a Rotman lens.

5. The wireless communication apparatus of claim 1, further comprising: an antenna array comprising a plurality of antenna elements, wherein each antenna element of the plurality of antenna elements is coupled to the corresponding antenna port of the plurality of antenna ports.

6. The wireless communication apparatus of claim 5, wherein the plurality of antenna elements are positioned in a circular formation having a predefined radius, with a corresponding position for each antenna element associated with an orbital phase of the OAM beams.

7. The wireless communication apparatus of claim 1, wherein the control circuitry is configured to measure the misalignment of the OAM beams in communication with a remote wireless communication apparatus.

8. The wireless communication apparatus of claim 7, wherein the misalignment further comprises one or more of an off-axis misalignment and a nonparallel misalignment.

9. The wireless communication apparatus of claim 1, wherein the plurality of output phase shifters comprise varactor phase shifters tunable with the phase shift values determined by a projection of each antenna elements on a transmission-reception line to a corresponding antenna element of a remote wireless communication apparatus.

10. The wireless communication apparatus of claim 9, wherein the control circuitry is configured to measure the misalignment by calculating an alignment for each pair of antenna elements to determine the phase shift values for each phase shifter associated with the corresponding antenna element and antenna port.

11. The wireless communication apparatus of claim 1, wherein the plurality of output phase shifters comprise passive phase shifters.

12. The wireless communication apparatus of claim 1, wherein the plurality of output phase shifters comprise bidirectional phase shifters for providing reciprocal phase adjustments to transmission OAM beams and received OAM beams of the OAM beams.

13. The wireless communication apparatus of claim 1, further comprising transceiver circuitry coupled to the plurality of beam ports, and configured to provide a plurality of OAM beams to the plurality of beam ports, wherein each beam port of the plurality of beam ports receives a signal associated with samples of the plurality of OAM beams at a set orbital phase corresponding to each beam port.

14. The wireless communication apparatus of claim 13, wherein the samples of the plurality of OAM beams are sampled at a rate sufficient to avoid phase aliasing between the OAM beams.

15. A wireless communication apparatus, comprising:
a Butler Matrix comprising a plurality of antenna ports and a plurality of beam ports, wherein the plurality of antenna ports are positioned for communicating orbital angular momentum (OAM) beams; and
a plurality of output phase shifters, wherein each output phase shifter is coupled to a corresponding antenna port of the plurality of antenna ports, and wherein phase shift values for the plurality of output phase shifters and an adjusted differential phase of a signal for at least one beam port of the plurality of beam ports based on a rotation mismatch between antenna elements associated with the OAM beams are configured to correct a misalignment of the OAM beams.

16. The wireless communication apparatus of claim 15, further comprising a plurality of antenna elements coupled to each antenna port of the plurality of antenna ports.

17. The wireless communication apparatus of claim 15, wherein the plurality of output phase shifters comprise passive phase shifters.

18. The wireless communication apparatus of claim 15, wherein the plurality of output phase shifters comprise bidirectional phase shifters for providing reciprocal phase adjustments to transmission OAM beams and received OAM beams of the OAM beams.

19. The wireless communication apparatus of claim 15, further comprising:
control circuitry; and
transceiver circuitry coupled to the control circuitry and the plurality of beam ports, wherein the transceiver circuitry is configured to provide a plurality of OAM beams to the plurality of beam ports, and wherein each beam port of the plurality of beam ports receives a corresponding control signal from the control circuitry, wherein each corresponding control signal is associated with samples of the plurality of OAM beams at a set orbital phase corresponding to each beam port.

20. The wireless communication apparatus of claim 19, wherein the samples of the plurality of OAM beams are sampled to avoid phase aliasing between the OAM beams.

21. A wireless communication apparatus comprising:
transceiver circuitry configured to generate signals for a plurality of orbital angular momentum (OAM) beams;
a plurality of beam ports coupled to the transceiver circuitry to communicate the plurality of OAM beams;
a plurality of antenna ports, wherein each antenna port is associated with a corresponding orbital phase of the plurality of OAM beams;

a plurality of 90-degree couplers and internal phase shifters configured to couple the plurality of beam ports to the plurality of antenna ports;

a plurality of antenna elements positioned in a circular array, with each element coupled to a corresponding antenna port of the plurality of antenna ports; and control circuitry coupled to the transceiver circuitry and configured to:

measure a misalignment of the plurality OAM beams in communication with a remote wireless communication apparatus;

determine a rotation mismatch between antenna elements associated with the plurality of OAM beams; and provide control signals to the transceiver circuitry to correct an alignment mismatch and the rotation mismatch, the control signals being configured to adjust a differential phase of a signal for at least one beam port of the plurality of beam ports based on the determined rotation mismatch.

22. The wireless communication apparatus of claim 21, wherein at least some of the control signals are associated with a set orbital phase for a corresponding beam port of the plurality of beam ports.

23. The wireless communication apparatus of claim 21, wherein the misalignment comprises an off-axis misalignment.

24. The wireless communication apparatus of claim 21, wherein the internal phase shifters comprise bidirectional phase shifters for providing reciprocal phase adjustments to transmission OAM beams and received OAM beams of the OAM beams.

25. The wireless communication apparatus of claim 21, wherein the internal phase shifters comprise varactor phase shifters tunable with phase shift values determined by a projection of each antenna element on a transmission-reception line to a corresponding antenna element of the remote wireless communication apparatus, and wherein the control circuitry is configured to measure the misalignment by calculating an alignment for each pair of antenna elements to determine the phase shift values for each phase shifter associated with the corresponding antenna element and antenna port.

26. A method comprising:

initiating, by a wireless communication apparatus, a communication link with a remote wireless communication apparatus, wherein the wireless communication apparatus and the remote wireless communication apparatus are configured to communicate using orbital angular momentum (OAM) beams, and wherein the wireless communication apparatus comprises a Butler Matrix, an antenna array, and a plurality of phase shifters coupling antenna ports of the Butler Matrix to corresponding elements of the antenna array;

measuring, by the wireless communication apparatus, a misalignment between the antenna array of the wireless communication apparatus, and an antenna array of the remote wireless communication apparatus;

measuring a rotation mismatch between antenna elements associated with the OAM beams;

selecting, by the wireless communication apparatus, phase shift values for the plurality of phase shifters and an adjusted differential phase of a signal for at least one beam port of a plurality of beam ports based on the rotation mismatch to compensate for the misalignment; and communicating a plurality of OAM beams between the wireless communication apparatus and the remote wireless communication apparatus using the phase shift values.

27. The method of claim 26, wherein measuring, by the wireless communication apparatus, the misalignment between the antenna array of the wireless communication apparatus and the antenna array of the remote wireless communication apparatus comprises:

receiving misalignment calculations from the remote wireless communication apparatus; and performing a set of misalignment measurements at the wireless communication apparatus.

28. The method of claim 26, wherein measuring, by the wireless communication apparatus, the misalignment between the antenna array of the wireless communication apparatus and the antenna array of the remote wireless communication apparatus comprises:

performing calculations for the rotation mismatch;

performing calculations for an off-axis misalignment; and performing calculations for a nonparallel misalignment.

* * * * *